US 7,787,702 B2

(12) United States Patent
Brown Elliott et al.

(10) Patent No.: US 7,787,702 B2
(45) Date of Patent: Aug. 31, 2010

(54) MULTIPRIMARY COLOR SUBPIXEL RENDERING WITH METAMERIC FILTERING

(75) Inventors: Candice Hellen Brown Elliott, Santa Rosa, CA (US); Michael Francis Higgins, Cazadero, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 204 days.

(21) Appl. No.: 11/914,587

(22) PCT Filed: May 19, 2006

(86) PCT No.: PCT/US2006/019657

§ 371 (c)(1),
(2), (4) Date: Nov. 16, 2007

(87) PCT Pub. No.: WO2006/127555

PCT Pub. Date: Nov. 30, 2006

(65) Prior Publication Data

US 2009/0058873 A1 Mar. 5, 2009

Related U.S. Application Data

(60) Provisional application No. 60/683,180, filed on May 20, 2005, provisional application No. 60/747,177, filed on May 12, 2006.

(51) Int. Cl.
*G06K 9/40* (2006.01)
*G09G 5/02* (2006.01)
(52) U.S. Cl. .................. 382/260; 345/589; 382/162
(58) Field of Classification Search .............. 382/254, 382/260–264, 274, 299, 162, 167; 345/589, 345/694, 591, 695, 698; 358/447; 349/106–108
See application file for complete search history.

(56) References Cited

U.S. PATENT DOCUMENTS

| 6,327,008 | B1 * | 12/2001 | Fujiyoshi | 349/106 |
| 6,750,875 | B1 * | 6/2004 | Keely et al. | 345/613 |
| 6,801,220 | B2 * | 10/2004 | Greier et al. | 345/694 |
| 7,495,722 | B2 * | 2/2009 | Roth et al. | 349/106 |
| 2004/0046725 | A1 | 3/2004 | Lee | |
| 2004/0051724 | A1 * | 3/2004 | Elliott et al. | 345/694 |
| 2004/0263528 | A1 | 12/2004 | Murdoch et al. | |
| 2006/0098033 | A1 * | 5/2006 | Langendijk | 345/694 |

FOREIGN PATENT DOCUMENTS

TW 558899 10/2003

OTHER PUBLICATIONS

European Search Report, EP6770785.1-2205, Nov. 4, 2009, 9 pages.

* cited by examiner

*Primary Examiner*—Yon Couso
(74) *Attorney, Agent, or Firm*—Innovation Counsel LLP

(57) ABSTRACT

Systems and methods of rendering image data to multiprimary displays that adjusts image data across metamers are herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

10 Claims, 16 Drawing Sheets

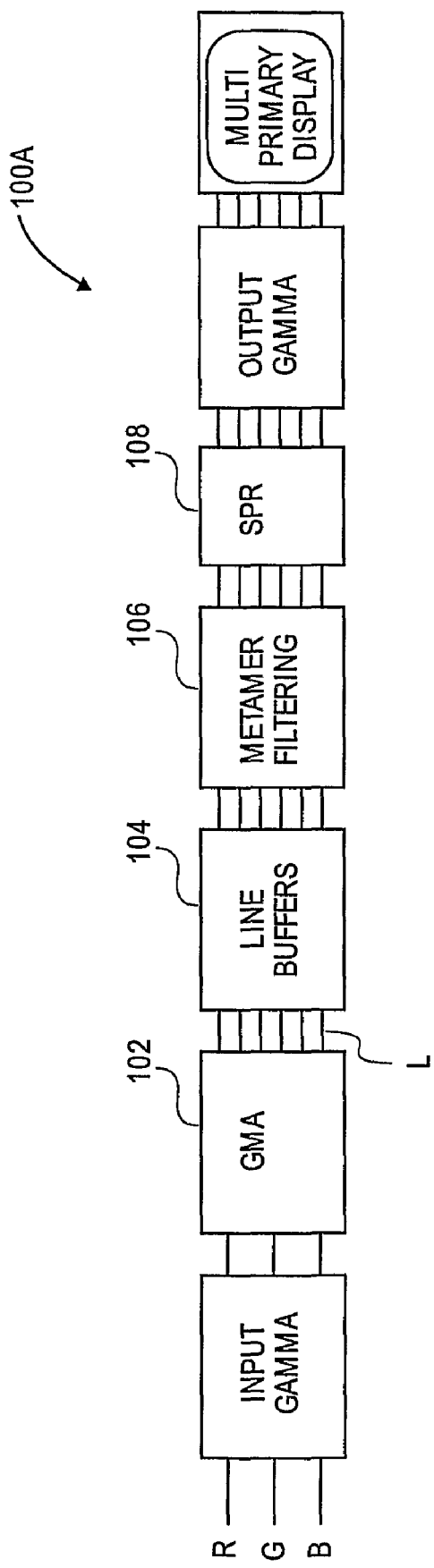
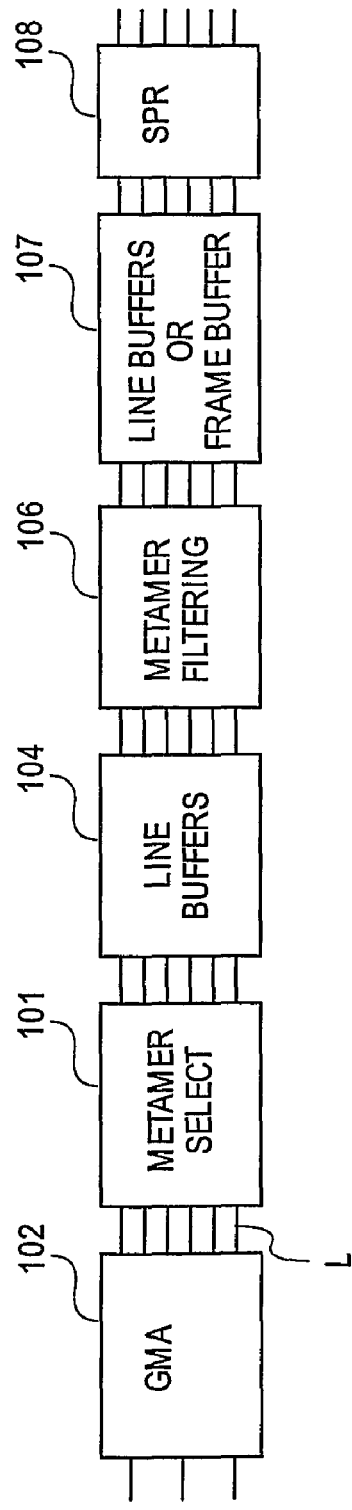
FIG. 1A
FIG. 1B

MULTIPRIMARY COLOR SUBPIXEL RENDERING WITH METAMERIC FILTERING

This application claims the benefit of U.S. Provisional Application 60/683,180 entitled MULTIPRIMARY COLOR SUB-PIXEL RENDERING WITH METAMERIC FILTERING, filed on May 20, 2005, and U.S. Provisional Application 60/747,177 entitled MULTIPRIMARY COLOR SUB-PIXEL RENDERING WITH METAMERIC FILTERING, filed on May 12, 2006, each of which is hereby incorporated by reference herein in its entirety.

TECHNICAL FIELD

The present application relates to various embodiments of display systems and methods for rendering image data to multiprimary displays that may utilize input image content to adjust image data across metamers, and to optimize sub-pixel values to improve image rendering accuracy or perception.

BACKGROUND

In commonly owned United States Patent Applications: (1) U.S. Pat. No. 6,903,754 ("the '754 patent") (Ser. No. 09/916,232), entitled "ARRANGEMENT OF COLOR PIXELS FOR FULL COLOR IMAGING DEVICES WITH SIMPLIFIED ADDRESSING," filed Jul. 25, 2001; (2) U.S. Pat. No. 6,905,115 ("the '115 application") (Ser. No. 10/024,326), entitled "IMPROVEMENTS TO COLOR FLAT PANEL DISPLAY SUB-PIXEL ARRANGEMENTS AND LAYOUTS," filed Dec. 14, 2001; (3) United States Patent Application Publication Number 2003/0128225 ("the '225 application") (Ser. No. 10/278,353), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (4) United States Patent Application Publication Number 2003/0128179 ("the '179 application") (Ser. No. 10/278,352), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (5) United States Patent Application Publication Number 2004/0051724 ("the '724 application) (Ser. No. 10/243,094), entitled "IMPROVED FOUR COLOR ARRANGEMENTS AND EMITTERS FOR SUB-PIXEL RENDERING," filed Sep. 13, 2002; (6) United States Patent Application Publication Number 2003/0117423 ("the '423 application") (Ser. No. 10/278,328), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (7) United States Patent Application Publication Number 2003/0090581 ("the '581 application") (Ser. No. 10/278,393), entitled "COLOR DISPLAY HAVING HORIZONTAL SUB-PIXEL ARRANGEMENTS AND LAYOUTS," filed Oct. 22, 2002; (8) United States Patent Application Publication Number 2004/0080479 ("the '479 application") (Ser. No. 10/347,001), entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003; (9) U.S. Pat. No. 7,046,256 ("the '256 patent") (Ser. No. 10/349,768), entitled "SYSTEMS AND METHODS OF SUB-PIXEL RENDERING IMPLEMENTED ON DISPLAY PANELS," filed Jan. 22, 2003, each of which is herein incorporated by reference in its entirety, novel sub-pixel arrangements are disclosed for improving the cost/performance curves for image display devices.

For certain sub-pixel repeating groups having an even number of sub-pixels in a horizontal direction, the following published patent applications systems and techniques to affect improvements, e.g. proper dot inversion schemes and other improvements, are disclosed and are herein incorporated by reference in their entirety: (1) United States Patent Application Publication Number 2004/0246280 ("the '280 application") (Ser. No. 10/456,839), entitled "IMAGE DEGRADATION CORRECTION IN NOVEL LIQUID CRYSTAL DISPLAYS," filed Jun. 6, 2003; (2) United States Patent Application Publication Number 2004/0246213 ("the '213 application") (Ser. No. 10/455,925), entitled "DISPLAY PANEL HAVING CROSSOVER CONNECTIONS EFFECTING DOT INVERSION," filed Jun. 6, 2003; (3) United States Patent Application Publication Number 2004/0246381 ("the '381 application") (Ser. No. 10/455,931), entitled "SYSTEM AND METHOD OF PERFORMING DOT INVERSION WITH STANDARD DRIVERS AND BACKPLANE ON NOVEL DISPLAY PANEL LAYOUTS," filed Jun. 6, 2003; (4) United States Patent Application Publication Number 2004/0246278 ("the '278 application") (Ser. No. 10/455,927), entitled "SYSTEM AND METHOD FOR COMPENSATING FOR VISUAL EFFECTS UPON PANELS HAVING FIXED PATTERN NOISE WITH REDUCED QUANTIZATION ERROR," filed Jun. 6, 2003; (5) United States Patent Application Publication Number 2004/0246279 ("the '279 application) (Ser. No. 10/456,806), entitled "DOT INVERSION ON NOVEL DISPLAY PANEL LAYOUTS WITH EXTRA DRIVERS," filed Jun. 6, 2003; (6) United States Patent Application Publication Number 2004/0246404 ("the '404 application") (Ser. No. 10/456,838), entitled "LIQUID CRYSTAL DISPLAY BACKPLANE LAYOUTS AND ADDRESSING FOR NON-STANDARD SUB-PIXEL ARRANGEMENTS," filed Jun. 6, 2003; (7) United States Patent Application Publication Number 2004/0246393 ("the '393 application") (Ser. No. 10/456,794), entitled "ALTERNATIVE THIN FILM TRANSISTORS FOR LIQUID CRYSTAL DISPLAYS," filed Jun. 6, 2003; (8) United States Patent Application Publication Number 2005/0083277 ("the '277 application") (Ser. No. 10/696,236), entitled "IMAGE DEGRADATION CORRECTION IN NOVEL LIQUID CRYSTAL DISPLAYS WITH SPLIT BLUE SUB-PIXELS", filed Oct. 28, 2003; and (9) United States Patent Application Publication Number 2005/0212741 ("the '741 application") (Ser. No. 10/807,604), entitled "IMPROVED TRANSISTOR BACKPLANES FOR LIQUID CRYSTAL DISPLAYS COMPRISING DIFFERENT SIZED SUB-PIXELS", filed Mar. 23, 2004. Each of these above referenced published applications and patents are hereby incorporated by reference herein in its entirety.

These improvements are particularly pronounced when coupled with sub-pixel rendering (SPR) systems and methods further disclosed in those applications and in commonly owned United States Patent Applications: (1) United States Patent Application Publication Number 2003/0034992 ("the '992 application") (Ser. No. 10/051,612), entitled "CONVERSION OF A SUB-PIXEL FORMAT DATA TO ANOTHER SUB-PIXEL DATA FORMAT," filed Jan. 16, 2002; (2) United States Patent Application Publication Number 2003/0103058 ("the '058 application") (Ser. No. 10/150,355), entitled "METHODS AND SYSTEMS FOR SUB-PIXEL RENDERING WITH GAMMA ADJUSTMENT," filed May 17, 2002; (3) United States Patent Application Publication Number 2003/0085906 ("the '906 application")

(Ser. No. 10/215,843), entitled "METHODS AND SYSTEMS FOR SUB-PIXEL RENDERING WITH ADAPTIVE FILTERING," filed Aug. 8, 2002; (4) United States Patent Application Publication Number 2004/0196302 ("the '302 application) (Ser. No. 10/379,767) entitled "SYSTEMS AND METHODS FOR TEMPORAL SUB-PIXEL RENDERING OF IMAGE DATA" filed Mar. 4, 2003; (5) United States Patent Application Publication Number 2004/0174380 ("the '380 application") (Ser. No. 10/379,765), entitled "SYSTEMS AND METHODS FOR MOTION ADAPTIVE FILTERING," filed Mar. 4, 2003; (6) U.S. Pat. No. 6,917,368 ("the '368 patent") (Ser. No. 10/379,766), entitled "SUB-PIXEL RENDERING SYSTEM AND METHOD FOR IMPROVED DISPLAY VIEWING ANGLES" filed Mar. 4, 2003; (7) United States Patent Application Publication Number 2004/0196297 ("the '297 application") (Ser. No. 10/409,413), entitled "IMAGE DATA SET WITH EMBEDDED PRE-SUB-PIXEL RENDERED IMAGE" filed Apr. 7, 2003. Each of these above referenced published applications and patents are hereby incorporated by reference herein in its entirety.

Improvements in gamut conversion and mapping are disclosed in commonly owned and co-pending United States Patent Applications: (1) United States Patent Application Publication Number 2005/0083345 ("the '345 application") (Ser. No. 10/691,200), entitled "HUE ANGLE CALCULATION SYSTEM AND METHODS", filed Oct. 21, 2003; (2) United States Patent Application Publication Number 2005/0083341 ("the '341 application") (Ser. No. 10/691,377), entitled "METHOD AND APPARATUS FOR CONVERTING FROM SOURCE COLOR SPACE TO RGBW TARGET COLOR SPACE", filed Oct. 21, 2003; (3) United States Patent Application Publication Number 2005/0083352 ("the '352 application") (Ser. No. 10/691,396), entitled "METHOD AND APPARATUS FOR CONVERTING FROM A SOURCE COLOR SPACE TO A TARGET COLOR SPACE", filed Oct. 21, 2003; and (4) United States Patent Application Publication Number 2005/0083344 ("the '344 application") (Ser. No. 10/690,716), entitled "GAMUT CONVERSION SYSTEM AND METHODS" filed Oct. 21, 2003. Each of these above referenced published applications and patents are hereby incorporated by reference herein in its entirety.

Additional advantages have been described in (1) United States Patent Application Publication Number 2002/0186229 ("the '229 application") (Ser. No. 10/150,394), entitled "ROTATABLE DISPLAY WITH SUB-PIXEL RENDERING", filed May 17, 2002; (2) United States Patent Application Publication Number 2004/0232844 ("the '844 application") (Ser. No. 10/442,320), entitled "SUB-PIXEL RENDERING FOR CATHODE RAY TUBE DEVICES", filed May 20, 2003; (3) United States Patent Application Publication Number 2005/0082990 ("the '990 application") (Ser. No. 10/442,356), entitled "IMPROVED PROJECTOR SYSTEMS", filed May 20, 2003; (4) United States Patent Application Publication Number 2004/0233308 ("the '308 application") (Ser. No. 10/442,555), entitled "IMPROVED IMAGE CAPTURE DEVICE AND CAMERA", filed May 20, 2003; (5) United States Patent Application Publication Number 2004/0233339 ("the '339 application") (Ser. No. 10/442,552), entitled "IMPROVED PROJECTOR SYSTEMS WITH REDUCED FLICKER", filed May 20, 2003; (6) United States Patent Application Publication Number 2005/0099540 ("the '540 application") (Ser. No. 10/696,235), entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; (7) United States Patent Application Publication Number 2005/0088385 ("the '385 application") (Ser. No. 10/696,026), entitled "SYSTEM AND METHOD FOR PERFORMING IMAGE RECONSTRUCTION AND SUB-PIXEL RENDERING TO EFFECT SCALING FOR MULTI-MODE DISPLAY" filed Oct. 28, 2003. Each of these above referenced published applications and patents are hereby incorporated by reference herein in its entirety.

Additionally, these co-owned and co-pending applications are herein incorporated by reference in their entirety: (1) United States Patent Application Publication Number 2005/0225548 ("the '548 application") (Ser. No. 10/821,387), entitled "SYSTEM AND METHOD FOR IMPROVING SUB-PIXEL RENDERING OF IMAGE DATA IN NON-STRIPED DISPLAY SYSTEMS" filed Apr. 9, 2004; (2) United States Patent Application Publication Number 2005/0225561 ("the '561 application") Ser. No. 10/821,386), entitled "SYSTEMS AND METHODS FOR SELECTING A WHITE POINT FOR IMAGE DISPLAYS" filed Apr. 9, 2004; (3) United States Patent Application Publication Number 2005/0225574 ("the '574 application") and United States Patent Application Publication Number 2005/0225475 ("the '575 application") (Ser. Nos. 10/821,353 and 10/961,506) respectively,—both entitled "NOVEL SUB-PIXEL LAYOUTS AND ARRANGEMENTS FOR HIGH BRIGHTNESS DISPLAYS" filed Apr. 9, 2004 and Oct. 7, 2004 respectively; (4) United States Patent Application Publication Number 2005/0225562 ("the '562 application") (Ser. No. 10/821,306), entitled "SYSTEMS AND METHODS FOR IMPROVED GAMUT MAPPING FROM ONE IMAGE DATA SET TO ANOTHER" filed Apr. 9, 2004; (5) United States Patent Application Publication Number 2005/0225563 ("the '563 application") (Ser. No. 10/821,388), entitled "IMPROVED SUB-PIXEL RENDERING FILTERS FOR HIGH BRIGHTNESS SUB-PIXEL LAYOUTS" filed Apr. 9, 2004; (6) United States Patent Application Publication Number 2005/0276502 ("the '502 application") (Ser. No. 10/866,447), entitled "INCREASING GAMMA ACCURACY IN QUANTIZED DISPLAY SYSTEMS" filed Jun. 10, 2004. Each of these above referenced published applications and patents are hereby incorporated by reference herein in its entirety.

The following co-owned applications are also herein incorporated by reference in their entirety: (1) Patent Cooperation Treaty (PCT) Application No. PCT/US 06/12768, entitled "EFFICIENT MEMORY STRUCTURE FOR DISPLAY SYSTEM WITH NOVEL SUB-PIXEL STRUCTURES" filed Apr. 4, 2006, and published in the United States as United States Patent Application Publication 2008/0170083 A1; (2) Patent Cooperation Treaty (PCT) Application No. PCT/US 06/12766, entitled "SYSTEMS AND METHODS FOR IMPLEMENTING LOW-COST GAMUT MAPPING ALGORITHMS" filed Apr. 4, 2006, and published in the United States as United States Patent Application Publication 2008/0150958 A1; (3) U.S. patent application Ser. No. 11/278,675, entitled "SYSTEMS AND METHODS FOR IMPLEMENTING IMPROVED GAMUT MAPPING ALGORITHMS" filed Apr. 4, 2006, and published as United States Patent Application Publication 2006/0244686 A1; and (4) Patent Cooperation Treaty (PCT) Application No. PCT/US 06/12521, entitled "PRE-SUB-PIXEL RENDERED IMAGE PROCESSING IN DISPLAY SYSTEMS" filed Apr.

4, 2006, and published in the United States as United States Patent Application Publication 2008/0186325 A1.

DISCLOSURE OF THE INVENTION

Technical Effect: The various embodiments of the display systems and image processing methods illustrated and described below have the technical effect of utilizing metamer selection in a color sub-pixelated multi-primary display system to transform and present data at a sub-pixel level.

One embodiment of a display system includes a spatial frequency detection unit that extracts a spatial frequency characteristic from input image data, and an adjustment unit that adjusts image data of first and second sets of sub-pixels according to the spatial frequency characteristic.

Another embodiment of a display system comprises a display having a sub-pixel repeating group. The sub-pixel repeating group comprises at least one metamer further comprising at least first and second sets of colored sub-pixels. The display system also comprises an optional luminance calculation unit for calculating luminance values from input image data, and a plurality of metamer filters for producing an adjustment value based upon a relationship of the luminance values. The display system also comprises a metamer adjustment unit for adjusting the intensity of the first and second sets of sub-pixels according to the adjustment value.

One embodiment of an image processing method extracts luminance data from said image data, adjusts intensity values between first second sets of sub-pixels according to a relationship based upon luminance data, and outputs the adjusted image data.

Another embodiment of an image processing method adjusts intensity values between first and second sets of sub-pixels to minimize image artifacts. The method operates in a display system comprising a display having a sub-pixel repeating group comprising at least one metamer, the metamer further comprising at least first and second sets of colored sub-pixels. The method includes modeling the behavior of changing intensity values between the first and second sets of colored sub-pixels; storing intensity adjustment values comprising the model in the display system, and employing the intensity adjustment values to adjust the first and second sets of colored sub-pixels.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIG. 1A shows one embodiment of a high level system diagram made in accordance with the principles of the present invention FIG. 1B shows another embodiment of a high level system diagram made in accordance with the principles of the present invention.

MODES FOR CARRYING OUT THE INVENTION

Figure 2:
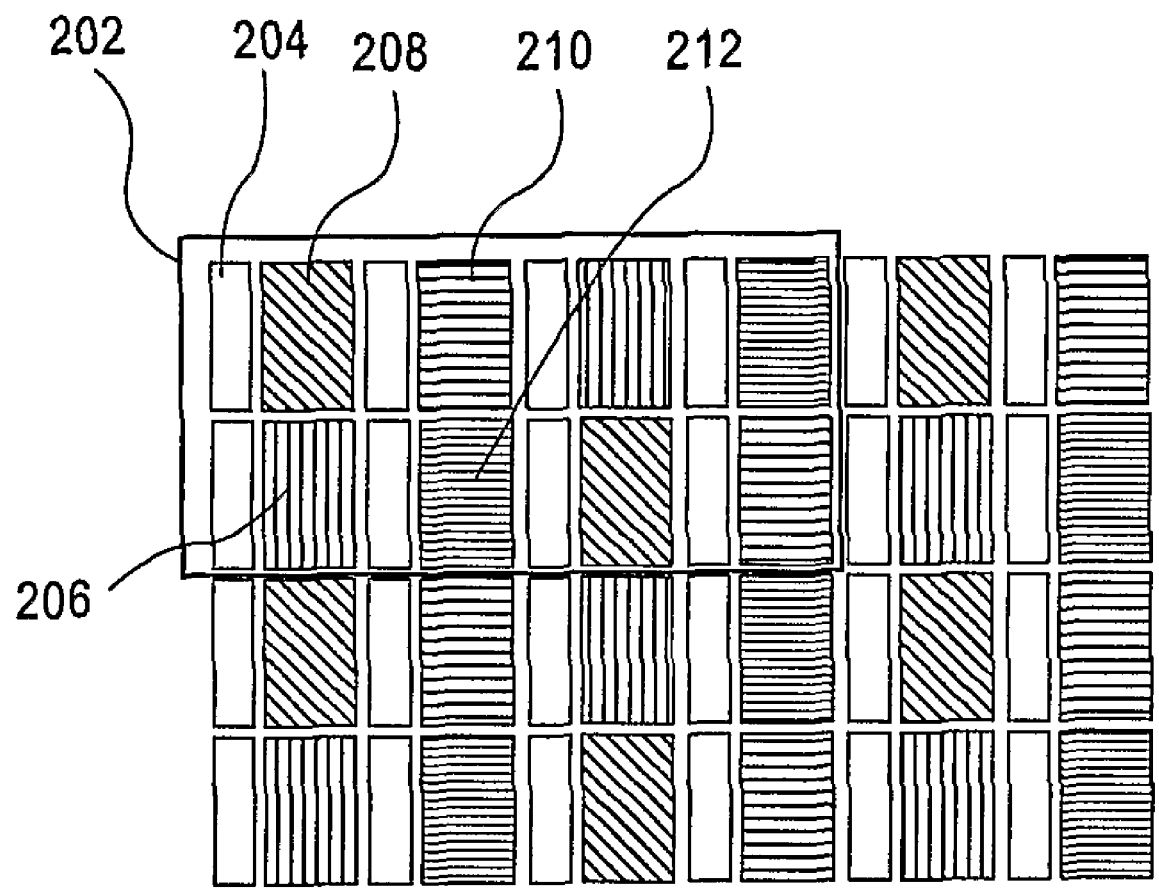
FIG. 2 shows section of a display with an arrangement of sub-pixels comprising five primaries, four of which lie in a lower resolution hexagonal grid.

In multiprimary & RGBW displays and their associated systems, it is sometimes needed to convert traditional RGB image data into multiprimary image data. Many techniques of Gamut Mapping Algorithms (GMA) are well known in the art and are also discussed in several of the above listed applications that are herein incorporated by reference. In many of the applications incorporated by reference, there are numerous novel sub-pixel repeating groups that comprise multiprimary displays. FIGS. 2 through 10 show a representative sampling of these novel sub-pixel repeating patterns that are further discussed in the aforementioned applications. The techniques of the present application apply to these exemplary sub-pixel repeating patterns and others—either known or unknown—that would allow for different metamers to be selected within a region that may be substantially undistinguishable by the human eye as viewed at normal operating distances.

When four or more non-coincident color primaries are used in a display, commonly called a "multiprimary" display in the art, there are often multiple combinations of values for the primaries that may give the same color value. That is to say, for a given hue, saturation, and brightness, there may be more than one set of intensity values of the four or more primaries that may give the same color impression to a human viewer. Each such possible intensity value set is called a "metamer" for said color. Thus, a metamer on a sub-pixelated displays is a combination (or a set) of at least two groups of colored sub-pixels such that there exists signals that, when applied to each such group, yields a desired color that is perceived by the Human Vision System. Of course, such a signal may vary from group of sub-pixels to group, in order to produce the same or substantially similar perceived color. Because of this, a degree of freedom exists to adjust relative values of the primaries for some effect.

For example, in U.S. Pat. No. 6,536,904 to Kunzman teaches a method of reducing the visibility of field sequential color break-up by maximizing the intensity of the achromatic (i.e. white) primary of a four primary, RGBW projector. Also, U.S. Pat. No. 6,885,380 to Primerano et al. teaches a similar choice of maximizing the white primary of RGBW displays using different methods for the goal of reducing power in Organic Light Emitting Diode—both the '904 and the '380 patents are herein incorporated by reference.

Thus, metamer selection for a color sub-pixelated multi-primary display system, as a degree of freedom, offers several novel opportunities to transform and present data at a sub-pixel level. For merely one example, as will be discussed in greater detail below, the intensity value of the primary of a sub-pixel may be adjusted by the value of the relative luminance signal of the image being rendered at that sub-pixel point compared with its neighbors. In this fashion, the metamers may be adjusted to facilitate and improve the quality of the image rendering at the color sub-pixel level, thus improving the art of "sub-pixel rendering".

In general for metamers, any given color and brightness may be also realized by another set of intensity values of colored sub-pixels in the local area. For example, in an RGBW system, a W sub-pixel is a metamer for grey with a nearby group of R, G, and B sub-pixels. Of course, the sub-pixels that are used for creating a given color may be any nearby sub-pixels that are close enough that the Human Vision System will blend the colors together. These degrees of freedom—choosing signal values from among similar color sub-pixels coupled with the degree of freedom afforded by choosing among metamers, and thus signal values among different sets of color sub-pixels—allow the luminance component of a given image to be represented possibly with greater fidelity at the sub-pixel level while maintaining the correct brightness and color at a global (or perceptual) level.

For sub-pixel rendered images, metamer choices represent a potential opportunity to select a possibly desired metamer (maybe from a set of suitable metamers) that reduces possible errors between the desired and actual image displayed. RGBW systems are one example of display systems that may take advantage of these degrees of freedom. The metamers for RGBW systems may be found on a White vs. RGB axis. So, for merely one example, it may be possible to construct a filter that measures the high spatial frequency luminance signal at a given pixel mapped to a given sub-pixel and use it to concentrate the energy of the luminance signal onto the color that will be at that sub-pixel position after sub-pixel rendering. Using the luminance (i.e. "L") values—e.g. from the RGB to RGBWL gamut mapping operation disclosed in the above listed disclosures, it is possible to evaluate the amount of intensity that should be in the White vs. the RGB values based on the pixel location.

FIG. 1A shows a system level diagram 100a of one embodiment of the present invention. Display system 100a comprises a "pipeline" that accepts input pixel values and produces output for a multi-primary display. Most calculations in the pipeline may be done on linear color values, so an input gamma conversion and an output gamma conversion, although optional, may be desired. The input pixels may consist of 3 primary colors such as RGB or YCbCr that may be converted to multi-primary in GMA module 102. Gamut mapping algorithms are known in the art and indeed such techniques are described in many of the herein above referenced patent applications. In such systems, it is possible that the GMA module may also calculate the luminance channel, L, of the input image data signal—in addition to the other multi-primary signals.

It will be appreciated that the techniques of the present invention are also applicable in situations where the number of input primary colors is N and the number of output primary colors is M and (1) N is less than M; (2) N equals M, particularly where N=M>3; or (3) N is greater than M, particularly in a system that downsamples the color space. In addition, the techniques of the present invention are applicable in any color space mapping in which metamers exist within the output color space. In some systems, it may be desirable to map from a first multiprimary space into itself. In such a case, the techniques described herein are applicable as long as there are metamers in the color space. It should be appreciated that, in such cases, the need for a GMA is optional.

As will be discussed in further detail below, in one embodiment, the metameric calculations may be implemented as a filtering operation—referencing a plurality of surrounding image data (e.g. pixel or sub-pixel) values. These surrounding values are typically organized by a line buffer module 104, although other embodiments are possible, such as multiple frame buffers. This embodiment further comprises a metamer filtering module 106 which performs operations that will be described below. In one embodiment, it is possible for the metamer filtering to share the line buffers with sub-pixel rendering (SPR) module 108. For purposes of the present discussion, whenever the metamer filtering is combined with SPR in a manner similar to this, it is called "direct metamer filtering".

In another embodiment of the present invention, shown in FIG. 1B, display system 100b comprises several of the same modules as display system 100a. GMA module 102 may be included to map incoming image data from one color space to another. In this embodiment, the metamer filtering (at block 106) may be accomplished in a separate pass over the pixel data. For purposes of the present discussion, this processing is called "preconditioning metamer filtering". In this case, SPR module 108 may require a separate frame buffer or line buffer 107 apart from any memory or buffer 104 used by metamer filtering module 106.

Also, it may be possible to pre-select metamers of the input colors in metamer select module 101, as is described in an above incorporated by reference patent application. This metamer selection may be done on each pixel individually without filtering and thus may not require a line buffer or frame buffer.

Additionally, in FIG. 1B, metamer filtering module 106 is shown downstream on the display pipeline from the GMA module 102. This is one embodiment but other locations of the two modules may be advantageous. For example, the GMA module 102 may include a gamut clamping function as described in one of the above incorporated by reference patent applications. It may be advantageous to move the gamut clamping function after metamer filtering module 106. If colors are allowed to stay out-of-gamut until after module 106, the metamer filtering may bring some colors back into gamut and remove the necessity of clamping them, resulting in better color reproduction.

Figure 13:
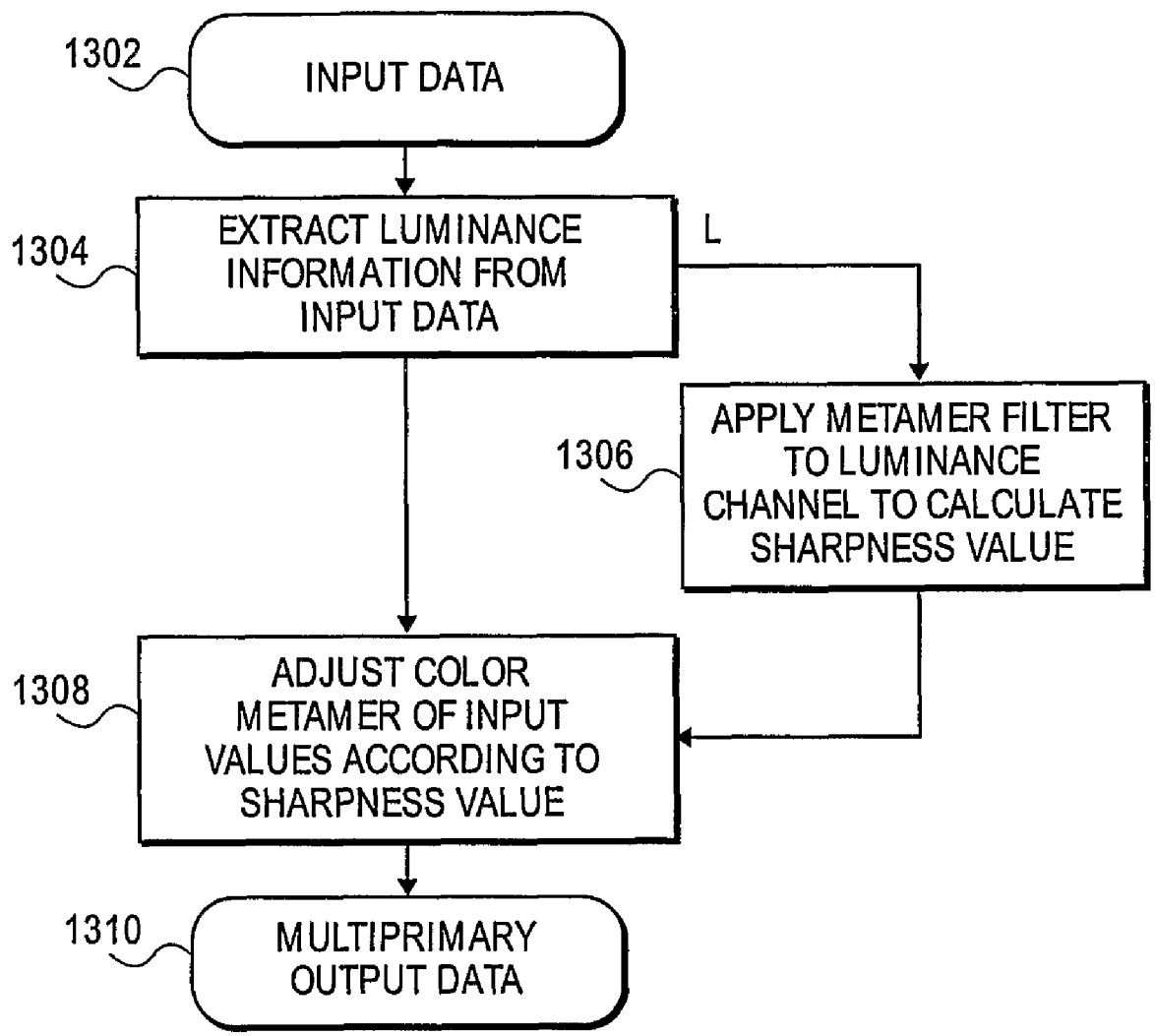
FIG. 13 shows a high level flowchart of metamer filtering.

Without regard to the particular modules or subsystems involved in the hardware, FIG. 13 provides a high level flowchart of the processes and techniques disclosed herein. A display system inputs image data (1302) and from the input data, the system extracts luminance information (1304). Of course, such information may already available to the system, if it is supplied by the external source or, if it is calculated via the GMA or other subsystem in the hardware. Such techniques for calculating luminance from image data is well known and several are disclosed in many applications incorporated above.

It will be appreciated that, while it is preferred that the system calculates luminance data from the input image data, it is possible to employ other data (e.g. green and/or red intensity/brightness values) that gives the system some indication of how the input image data is varying in the mid-to-high spatial frequency domain. Approximating luminance data from such high brightness sub-pixels—e.g. red and/or green or other colored sub-pixels (perhaps with a broad band pass) may be suitable.

The luminance data is input into a metamer filter (1306) and the output is a sharpness value which is then used as input to adjust or map image data from one metamer to another metamer according to the sharpness value (1308). The resulting image data may then be output (1310). The sharpness value, as described herein, may preferably be a value that allows adjustment of sub-pixel intensities (across metamers) without substantially changing the perceived color or intensity of the image. As described herein, one embodiment of the sharpness value embodies a linear relationship between metamer values; however, it will be appreciated that the sharpness value, as such, may embody other relationships (e.g. non-linear) that allow for the adjustment of sub-pixel intensity values across metamers as desired. The scope of the present invention properly encompasses these other obvious relationships.

It will also be appreciated that the manner of metamer filtering has, as one embodiment described herein, several 3×3 filter masks that employ Difference of Gaussian (DOG) and/or area resampling filters. It will be appreciated that many other filter masks are possible (e.g. dimensions other than 3×3; or diagonal mask entries as opposed to row and column, or orthogonal entries). In fact, it suffices for the purpose of the present invention to have some unit that detects spatial frequency variations and produces some characteristic—e.g. a value or a function that reflects upon what is being detected. That characteristic may then be used by a unit or module that would then calculate or select image data from a metamer set based upon the characteristic. Many systems and methods of detecting spatial frequency variation exist and are known—e.g. filters, adaptive filters, edge detector, flat field detector, blurring filter, and transform detector (e.g. Fourier, wavelet, DCT and the like).

For purposes of successfully carrying out the techniques discussed herein, it is sufficient that, for whatever filter mask selected, some alteration is accomplished that alters or selects the sub-pixel intensity values in the image data to the desired effect. The effect may be to sharpen regions of high spatial frequency (e.g. text or the like). Alternatively, there may be other reasons to alter sub-pixel intensity values across metamers for other reasons—perhaps to smooth out certain image features (e.g. possibly under a dynamic adaptive filtering condition). The scope of the present invention similarly encompasses these variants.

In addition, it is possible to apply luminance data to the image data in manners other than filtering. Other functional relationships for producing an adjustment—either calculated or approximated—is within the scope of the present invention. It may suffice for purposes of the present invention that intensity values of sub-pixels comprising approximate metamers are adjusted according to some relationship based upon the luminance data. The adjusted image data may then output to a display.

As an additional embodiment, it is possible to introduce random noise to select among equivalent metamers to create a dither system to improve grey scale performance or to reduce quantization error. For example, the 'a' value described herein may represent or include such a noise signal. Such techniques to introduce noise are known in the art and several are detailed in many of the applications incorporated above.

Calculating Metamers

It is possible to model the dynamic relationships between metamer sub-pixel groups and associated signals. For example, it is possible to find linear relationships between the metamers and signals of any particular color—to allow calculating "nearby" metamers and signals. Such a model could be used to adjust intensity values of sub-pixels comprising a metamer in a manner so as to minimize image artifacts and errors—such as color error or the like. From such a model, intensity adjustment values may be stored in a display system and employed whenever there is a need to adjust image data in according with certain data, such as luminance data as mentioned above.

For example, when one of the primaries in a metamer is changed by an amount "a", one might change each of the other primaries by an amount "a*m"—where the 'metamer slope' term "m" may be different for each of the primaries. As will be discussed further, these slope terms may be calculated from the matrix M2X that converts colors from the multi-primary system into CIE XYZ coordinates. It is known in the art to calculate this conversion matrix from measurements of the chromaticity and luminosity of the primaries of a multi-primary system—indeed, there are several such conversion matrices discussed in co-pending and co-owned United States Patent Applications 2005/0083341 and 2005/0083352 which are incorporated by reference.

In the case of a multi-primary system with only four primaries, it is possible to directly determine the slope terms for calculating metamers. There are several useful display layouts mentioned in the patents included by reference and included here for convenience as examples of the principles of the present invention. Two examples are a high brightness RGBW (with repeating sub-pixel group 320 comprising red 306, green 308, blue 310 and white 304 sub-pixels) shown in FIGS. 3, 4, and 5A and a wide gamut RGBC (with repeating sub-pixel group 802 comprising red 806, green 808, blue 810, and cyan 804 sub-pixels) display shown in FIG. 8. The method described below will use RGBC as an example, but the process works with RGBW or any other four primary display system.

$$M2X \cdot \left[ \begin{pmatrix} r \\ g \\ b \\ c \end{pmatrix} + \begin{pmatrix} a \cdot mr \\ a \cdot mg \\ a \cdot mb \\ a \cdot mc \end{pmatrix} \right] = M2X \cdot \begin{pmatrix} r \\ g \\ b \\ c \end{pmatrix} \quad \text{Equation 100}$$

$$M2X \cdot \begin{pmatrix} mr \\ mg \\ mb \\ mc \end{pmatrix} = \begin{pmatrix} 0 \\ 0 \\ 0 \end{pmatrix} \quad \text{Equation 101}$$

$$M2X = \begin{pmatrix} Mrx & Mgx & Mgx & Mcx \\ Mry & Mgy & Mgy & Mcy \\ Mrz & Mgz & Mgz & Mcz \end{pmatrix} \quad \text{Equation 102}$$

Equation 100 states a linear assumption: If one starts with some arbitrary RGBC color [r g b c], add a small number 'a' times the set of metamer slope values [mr mg mb mc] and then convert to CIE XYZ with the M2X matrix, one will get the same CIE XYZ color after converting the original arbitrary color directly to CIE XYZ. The following process will calculate these metamer slope values. Equation 100 can be simplified by distribution, subtracting common terms from both sides, and dividing both sides by 'a' with the result in Equation 101. In the case of a four primary system, the M2X matrix may be a 4×3 matrix as shown in Equation 102 with the constant values Mrx, Mgx, etc.

In merely one embodiment, in order to find the m slope values, one might start by arbitrarily setting one of the m slope values to 1 (or some other convenient value) as shown in Equation 101. This is shown in Equation 103 with the M2X matrix expanded from Equation 102.

$$\begin{pmatrix} Mrx & Mgx & Mgx & Mcx \\ Mry & Mgy & Mgy & Mcy \\ Mrz & Mgz & Mgz & Mcz \end{pmatrix} \cdot \begin{pmatrix} mr \\ mg \\ mb \\ 1 \end{pmatrix} = \begin{pmatrix} 0 \\ 0 \\ 0 \end{pmatrix} \quad \text{Equation 103}$$

$$\begin{pmatrix} Mrx & Mgx & Mgx \\ Mry & Mgy & Mgy \\ Mrz & Mgz & Mgz \end{pmatrix} \cdot \begin{pmatrix} mr \\ mg \\ mb \end{pmatrix} = -\begin{pmatrix} Mcx \\ Mcy \\ Mcz \end{pmatrix} \quad \text{Equation 104}$$

Because one of the slopes (the mc slope for cyan) has been set to one (1), this may result in a column of constants in the result which can be subtracted from both sides. This is done in Equation 104. The remaining matrix on the left is square and the m slope values can be calculated by inverting the matrix and multiplying both sides by the result, as shown in Equation 105. It should be noted that other values besides one (1) will have a similar effect of producing a constant column.

$$\begin{pmatrix} mr \\ mg \\ mb \end{pmatrix} = \begin{pmatrix} Mrx & Mgx & Mgx \\ Mry & Mgy & Mgy \\ Mrz & Mgz & Mgz \end{pmatrix}^{-1} \times -\begin{pmatrix} Mcx \\ Mcy \\ Mcz \end{pmatrix} \quad \text{Equation 105}$$

This calculates the values of mr, mg, and mb when mc is one (1). When the cyan primary of a color is changed by an amount 'a', the other primaries should be changed by a*mr, a*mg and a*mb to create a metamer of the original color. It is possible to repeat the above procedure while arbitrarily setting a different slope constant to one (1), subtracting a different constant column from both sides, and solving for the remaining variables. Alternately, one may calculate the m slope values once as above, and then divide the set of slopes by each of the calculated slopes in turn to generate the set of slopes for each starting primary. An example of the M2X matrix for a test RGBC display is shown below with the m slope values for each primary as calculated by the above procedure.

$$\begin{pmatrix} 0.585059 & 0.153445 & 0.14169 & 0.069806 \\ 0.306459 & 0.377712 & 0.061989 & 0.253839 \\ 0.037147 & 0.059017 & 0.681883 & 0.310953 \end{pmatrix} \quad \text{Matrix 106}$$

$$\begin{pmatrix} 1 \\ -4.301048 \\ -2.307103 \\ 5.756058 \end{pmatrix} \quad \text{M107}$$

$$\begin{pmatrix} -0.232501 \\ 1 \\ 0.536405 \\ -1.338292 \end{pmatrix} \quad \text{M108}$$

$$\begin{pmatrix} -0.433444 \\ 1.864263 \\ 1 \\ -2.494929 \end{pmatrix} \quad \text{M109}$$

$$\begin{pmatrix} 0.17373 \\ -0.747221 \\ -0.400813 \\ 1 \end{pmatrix} \quad \text{M110}$$

Matrix 106 above is an example calculated from primary colorimetry and luminosity readings of a theoretical RGBC display. Matrix 107 is a table of metamer slope values to use when one knows how much one wishes to change red and needs to calculate how much to change the others. Matrix 108 shows how much to change the others when green is changed, Matrix 109 is when blue is changed and Matrix 110 is for when cyan is changed.

Two special cases are worth pointing out. As shown in some of the patent applications incorporated by reference, it is possible to make simplifying assumptions about the primaries and white point of a display—thus greatly simplify the design of the display system. When calculating the metamer slopes as above, there is one more variable that can be used to simplify designs of systems using metamers. The variable that can result in simplifications here is the relative luminosity of the primaries. In one embodiment, such as the RGBW sub-pixel layout of FIGS. 3, 4, and 5A, the luminosity of the W sub-pixel 304 is approximately equal to the combined brightness of the other three primaries 306, 308, and 310, or accounts for approximately half of the total luminosity of the display. If the following assumptions are made, the metamer m slope values have particularly easy values to implement:
  1 The RGB primaries substantially match the Rec. 709 primaries.
  2 The display produces a white point that substantially matches the D65 standard white point.
  3 The relative luminosity of the RGB primaries is substantially the same as in a 3 primary RGB system with the same Rec. 709 and D65 assumptions.
  4 The W sub-pixels account for one half of the total luminosity of each sub-pixel layout.

The assumptions yield a particular M2X matrix (shown below). If this M2X matrix is used in the procedure above to calculate the metamer slope values when changing the W primary, this results in a particularly convenient set of values as shown below:

$$\begin{pmatrix} 0.206212 & 0.178789 & 0.090232 & 0.475234 \\ 0.106328 & 0.357579 & 0.036093 & 0.5 \\ 0.009666 & 0.059596 & 0.475222 & 0.544485 \end{pmatrix}$$

M2X for the above assumptions $$\begin{pmatrix} -1 \\ -1 \\ -1 \\ 1 \end{pmatrix}$$

metamer slope values for changing W

Thus, if W is changed by any amount, it may only suffice to change the other primaries by the opposite amount to generate a metamer for the starting color. From this set, it is easy to see that changing one of the RGB primaries requires changing the other color primaries by the same amount and the W primary by the opposite amount.

Figure 6:
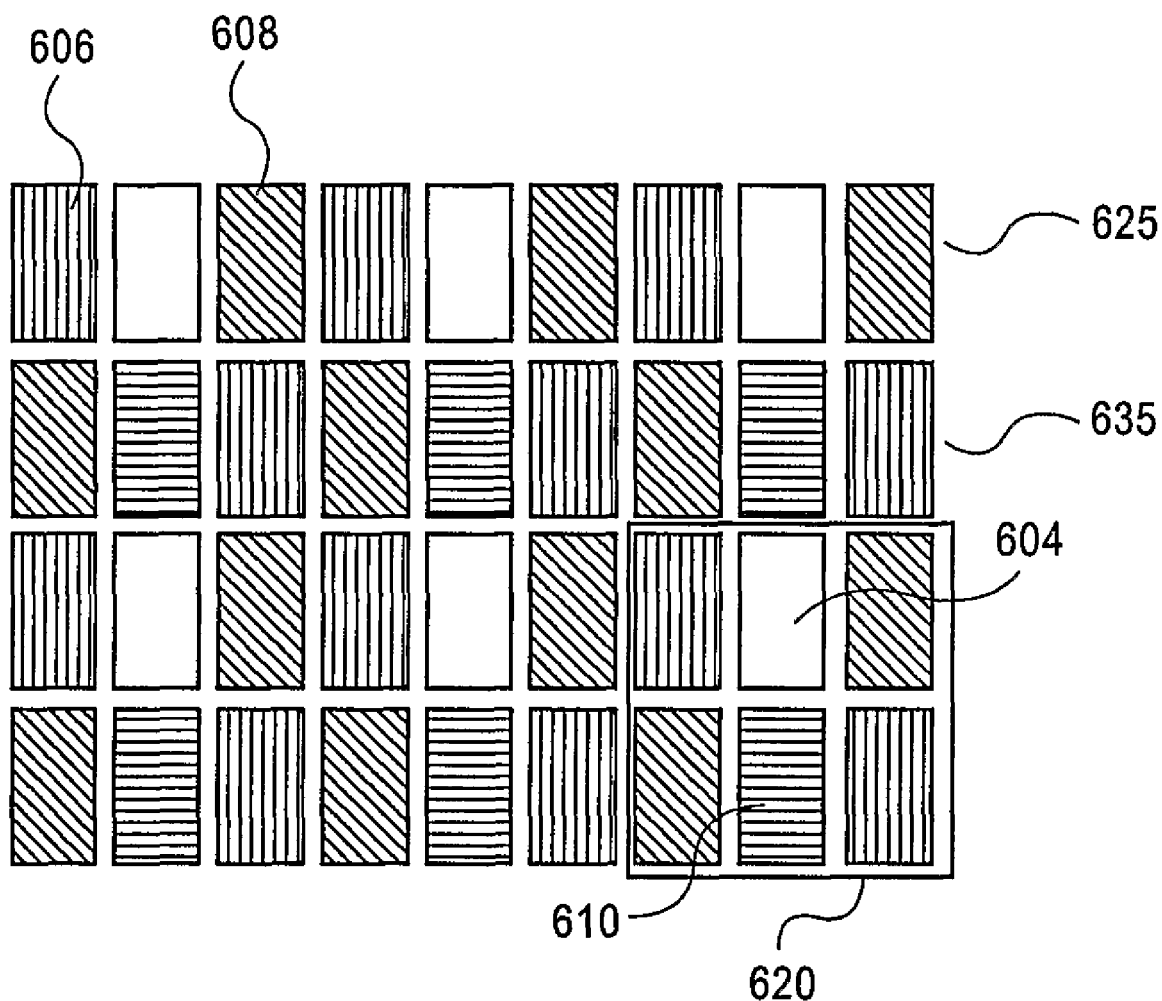
FIG. 6 shows a section of a display comprised of six sub-pixel repeat cell groups comprising four primaries.

In another embodiment, such as the case of the RGBW layout FIG. 6 (with repeating sub-pixel grouping 620 comprising red 606, green 608, blue 610 and white 604 sub-pixels), the white 604 sub-pixel has approximately one third of the total brightness of sub-pixel group 620. As a result, the white sub-pixel is equal to approximately one half of the remaining ⅔'s of the luminosity. This relationship allow another convenient implementation in either hardware or software. For example, if one replaces assumption Number 4 above with:

4 The W sub-pixel accounts for one third of the total luminosity of each sub-pixel layout.

From this, one may calculate the M2X matrix and metamer slope values and the result is:

$$\begin{pmatrix} 0.27495 & 0.238386 & 0.120309 & 0.316823 \\ 0.141771 & 0.476772 & 0.048124 & 0.333333 \\ 0.012888 & 0.079462 & 0.63363 & 0.36299 \end{pmatrix}$$

M2X for L1W assumptions $$\begin{pmatrix} -0.5 \\ -0.5 \\ -0.5 \\ 1 \end{pmatrix}$$

metamer slope values for changing W

Thus, if one changes W by any amount, one may change the other primaries by half that amount in the opposite direction to generate a metamer for the starting color. Conversely, if one changes one of the color primaries by any amount, then this requires changing the other color primaries by the same amount and the W primary by twice the amount in the opposite direction. It should be noted that calculating half or double any amount can easily be done in hardware with a minimum of gates and therefore a minimum of expense. There is, of course, some degree of freedom in implementing such change. For example, one could change the values of all of the sub-pixels within a repeating group to affect the desired result. Alternatively, only half of the red 606 and the green 608 sub-pixels may be adjusted within a given repeating group 620 to affect the desired change. One possible advantage for performing the change on one half of the available sub-pixels within a group might be for hardware optimization. For example, fewer gates or less memory may be needed if the changes could occur on a same line of output data—as opposed to multiple lines of output data.

It should also be noted that, in an RGBW layout such as that shown in FIG. 6, the blue 610 sub-pixel may contribute less to the luminosity than the Rec. 709 and D65 assumptions above would suggest. If this dimming of blue was taken into account then a different set of m slope values would result that may be more accurate but may not be as easy to implement in hardware.

All the above metamer slope calculations assumed a display with only four (4) primaries. As mentioned above, similar procedures can be made to work with any number of primaries. However, once the number of primaries is five (5) or more, the step in Equation 105 may need to be changed because the remaining matrix is no longer square and may not be inverted. There are several procedures that still allow the generation of useful metamer slope numbers. A non-invertible matrix does not mean that there is no solution to the problem; it means that there are many solutions. Only one solution may be suitable to generate usable sets of metamers.

In multi-primary systems larger than four, there will be an equation like Equation 101 that has more than four m slope values. One approach to solving these would be to set more than one of the m slopes to arbitrary values. When only three m slope values remain, then the subsequent steps may contain a square matrix that may then be inverted. The choice of values to use need not be completely arbitrary. For example, in a five primary high brightness wide gamut RGBCW (red, green, blue, cyan, and white) system it might be reasonable to assume that red and cyan are complimentary colors and should change in opposite directions so one (1) for the mw slope value and negative one (−1) for the mc slope values may be a good place to start.

Figure 7:
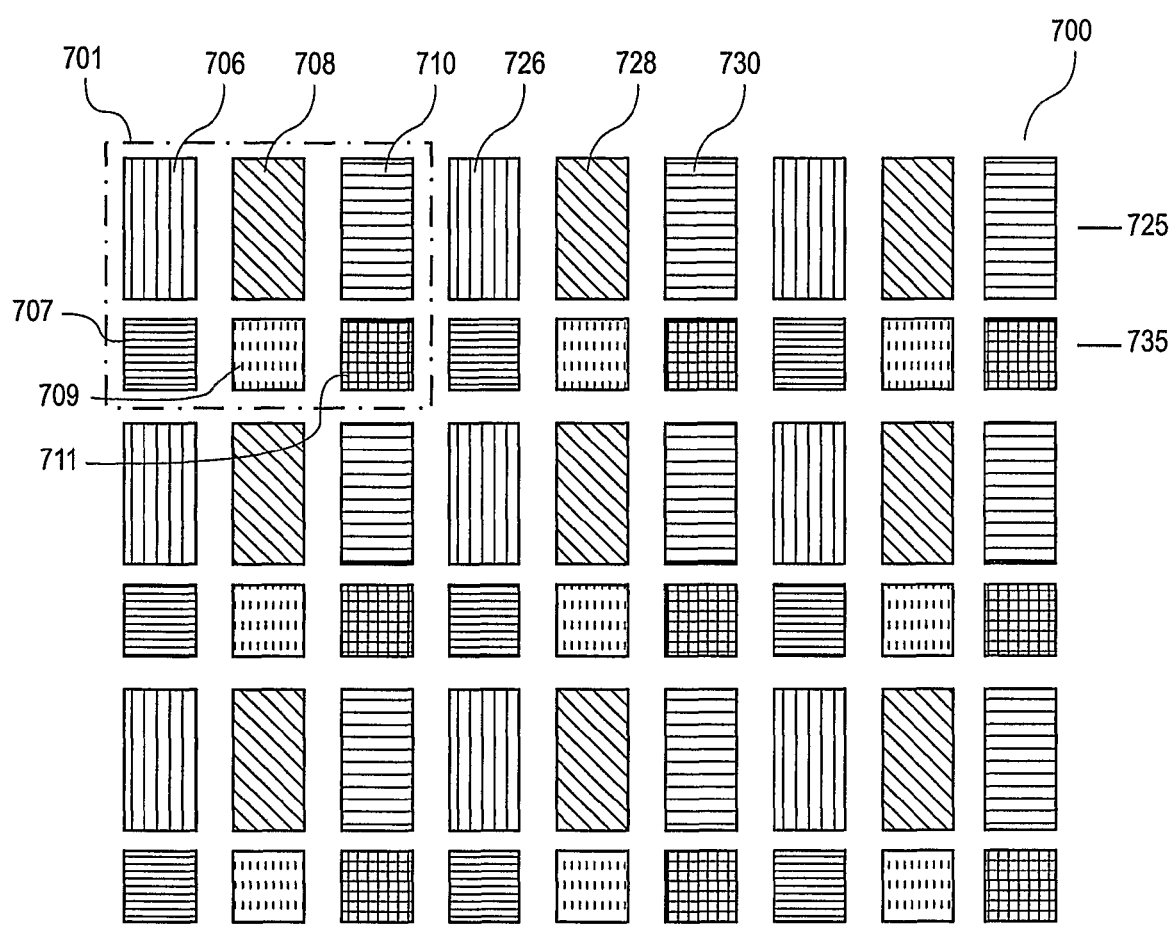
FIG. 7 shows a section of a display comprised of six sub-pixel repeat cell groups comprising six primaries.

In a six primary system like that of FIG. 7 (with a sub-pixel repeating group 701 comprising red 706, green 708, blue 710, cyan 707, magenta 709, and yellow 711 sub-pixels), since blue and green can combine to make cyan, one could set the mg and mb slope values to negative one (−1) while setting the mc slope to 1. Choosing different values besides negative one (−1) for the complimentary primaries may result in other solutions. It may be advantageous to change the arbitrary values until a "convenient" set of metamer slopes is found that is easier to implement in hardware.

Another solution to solving for m slope values in multi-primary systems greater than four would be to use a numerical solver. This is actually similar to the previous discussion but with a computer algorithm choosing arbitrary values until a set that works is found. Many numerical solver packages are available, one that has been shown to work is the solver built into the Mathcad program by Mathsoft Engineering & Education, Inc. A numerical solver like this has a drawback that it may choose an undesirable solution. However, these packages allow one to set multiple constraint equations to avoid this. For example, constraining the solver from setting any of the slopes to zero, from choosing slopes greater than two (2), making sure that complimentary colors have opposite sign slopes, etc.

To simplify controller hardware designs, it may be desirable to adjust the size and/or brightness of the sub-pixels to produce convenient metamer slope values. The layouts of FIGS. 3 and 6, for example, resulted in metamer slopes that were 1 or powers of two. In the layout of FIG. 7, the size of the cyan 707 magenta 709 and yellow 711 sub-pixels may be resized in relation to red, green and blue (due to their larger wavelength bandpass) until the metamer slope solutions are convenient numbers, such as: one half, one, two or other suitable numbers easy to implement in hardware.

In an alternate embodiment, these sub-pixels could remain substantially the same size as the other sub-pixels—e.g. if the ratio of the brightness of the CYM primaries to the RGB primaries have a convenient value. The example of the layout of FIG. 6 shows that a ratio of 2:1 can produce metamer slopes that are all 1 or ½. Other ratios may produce other convenient metamer slope values.

In other embodiments, adjusting the brightness of the different primaries may produce these simplifying results. One possible way of decreasing the brightness of a primary would be to increase the saturation. As the color of a primary becomes more pure—e.g. as the band pass filter becomes more narrow—the luminosity of the primary becomes lower. This adjustment can be done in the design of a display to produce "convenient" metamer slopes while at the same time increasing the total gamut of the display.

Figure 3:
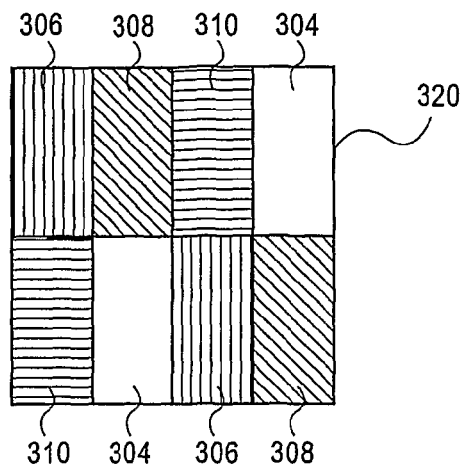
FIG. 3 shows an eight sub-pixel repeat cell group comprising four primaries which are substantially twice as tall as wide.
Figure 4:
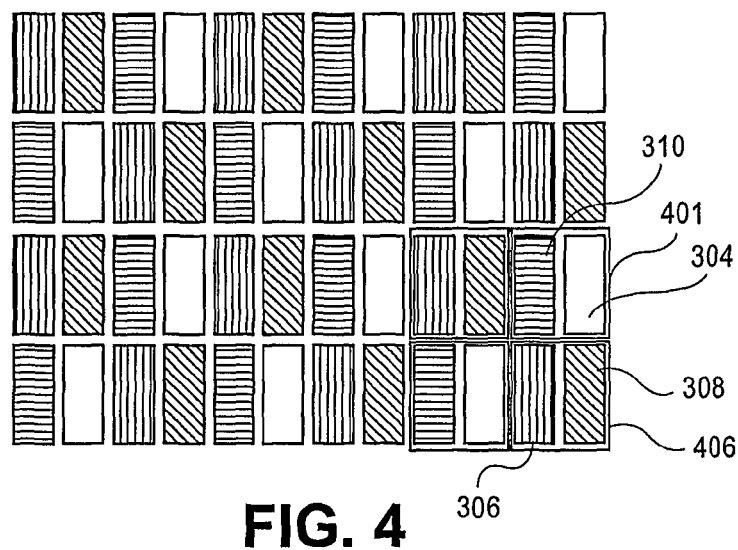
FIG. 4 shows a section of a display comprised of the repeat cell group of FIG. 3 with 'one-pixel-to-two-sub-pixel' mapping.

Metamer Filtering:

On the RGBW system having the sub-pixel repeating grouping 320, as shown in FIG. 3, the layout could be seen as a checker board of white alternating with color (or more precisely, two checkerboards—one of blue and white sub-pixels and another of red and green sub-pixels). In sub-pixel rendering on this layout, one could perform a version of area resample sub-pixel rendering—such as 'One-Pixel-to-Two-Sub-pixel' mapping. In such a rendering, one input pixel may be mapped to a white 304 and blue 310 sub-pixel pair, such as pair 401 as shown in FIG. 4, and the surrounding alternating input pixels may be mapped to a green 308 and red 306 sub-pixel pair (e.g. 406).

The freedom to select a color from among various metamers creates a new possibility to improve images. A display can be designed to select metamers in such a way that the W sub-pixel values are increased when they lie on the bright side of a high-frequency edge or decreased when they lie on the dark side of high-frequency edges. When red 306 and green 308 sub-pixel pairs 406 fall on the bright side of a high-frequency edge, it may be desirable to select a metamer such that the R and G sub-pixel values are increased. Conversely, when the sub-pixel pair 407 lies on the dark side of an edge the R and G sub-pixel values should be decreased. The B sub-pixel does not contribute significantly to brightness and does not need to be considered.

The discussion above implies that different, perhaps opposite, filtering operations should be done on sub-pixel pairs 401 and sub-pixel pairs 406. The two filters below are one embodiment of these filters:

WB mapped pixel $$a = \begin{matrix} 0 & -x/4 & 0 \\ -x/4 & x & -x/4 \\ 0 & -x/4 & 0 \end{matrix}$$

RG mapped pixel $$a = \begin{matrix} 0 & x/4 & 0 \\ x/4 & -x & x/4 \\ 0 & x/4 & 0 \end{matrix}$$

The value of "x" may be adjusted as a scale factor of this operation. The value x=0.5 is a good value in one embodiment of the present invention but other values may be chosen. It should be noted that the sign of the filter is reversed for the RG color vs. white sub-pixel locations. This may lead to several hardware or software optimizations. For example, using one filter but inverting the sign of the result on every other output sub-pixel pair. These filters resemble orthogonal sharpening filters from the art, however they are convolved with the L or luminance channel of the multi-primary data and not the color channels. The calculation of L is often done as a step in the GMA and we have discovered that it is advantageous to save this value for later processing steps. This saved L value is shown between GMA module 102 and Line Buffers 104 in FIGS. 1*a* and 1*b*.

In a prior art sharpening filters, the resulting 'a' value of the filter operation is eventually stored back in the pixel centered under the filter. However, in metamer filtering the center 'a' value is used instead to modify the metamer of the center pixel with the following equations:

$W=W+a;$ $R=R-mr*a;$ $G=G-mg*a;$ $B=B-mb*a;$

The mr, mg and mb constants are the metamer slope values. As described above with the layout of FIG. 3, these slope values may all have the value one (1)—making the calculations easy to perform. It may be advantageous to set the default value of the metamer such that the W value equals the highest valued colored primary, or as close as possible to it. This will allow for the greatest "head-room" for the metamer filtering operation. One possible method of performing this metamer adjustment is disclosed in co-pending patent application, entitled SYSTEMS AND METHODS FOR IMPLEMENTING IMPROVED GAMUT MAPPING ALGORITHMS (U.S. Ser. No. 11/278,675, US Published Patent Application Number 2006/0244686 herein incorporated by reference in its entirety) and is shown in FIG. 1B as metamer select module 101.

Figure 11:
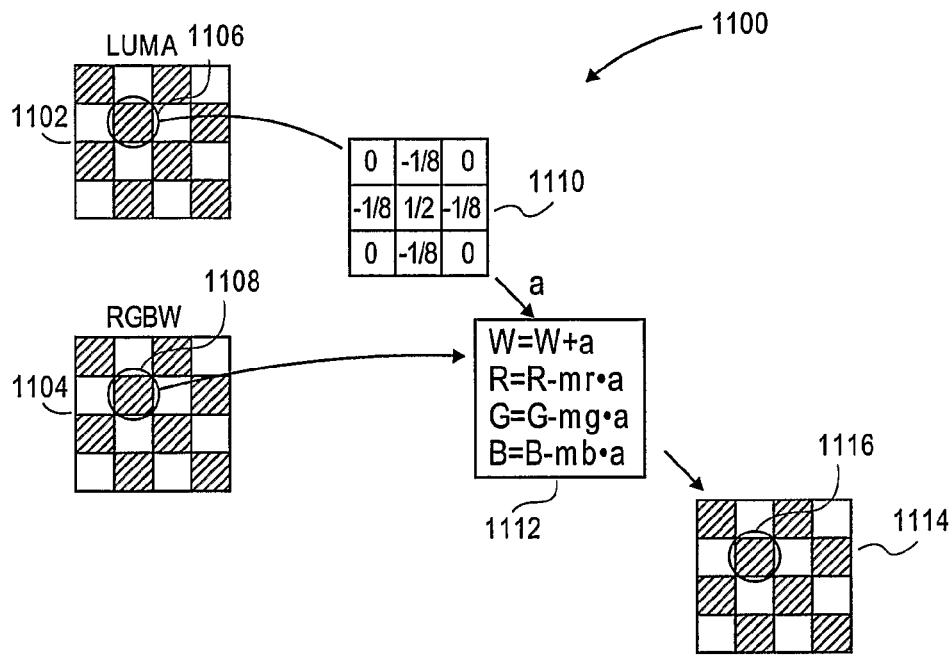
FIG. 11 shows the operation of one embodiment of metamer filtering on a first set of pixels.

FIG. 11 is a high level diagram of one embodiment of metamer filtering. The system may operate on two sets of data, luminance data 1102 and image (or color) data 1104. These data sets may be coincident spatially—e.g. 1106 is the luminance data of image data 1104. Luminance channel 1102 is sampled for high frequency information with a filter kernel 1110. This filter kernel is described above for use on the BW sub-pixel pairs of FIG. 3. In FIG. 11, the value of x may be chosen to be 0.5 and the resulting coefficients may be calculated as ½ and minus ⅛. This filter may be applied to a 3×3 area centered on a BW pixel 1106. The result is a sharpening value 'a'—which is used to change the metamer of a color in step 1112. For each value in the luminance channel 1102, there is a corresponding R G B and W value 1108 shown diagrammatically in the color channels 1104. The RGBW values have their metamer changed in step 1112. The resulting metamer 1116 is stored in output buffer 1114 or passed on to the next step of processing.

Figure 12:
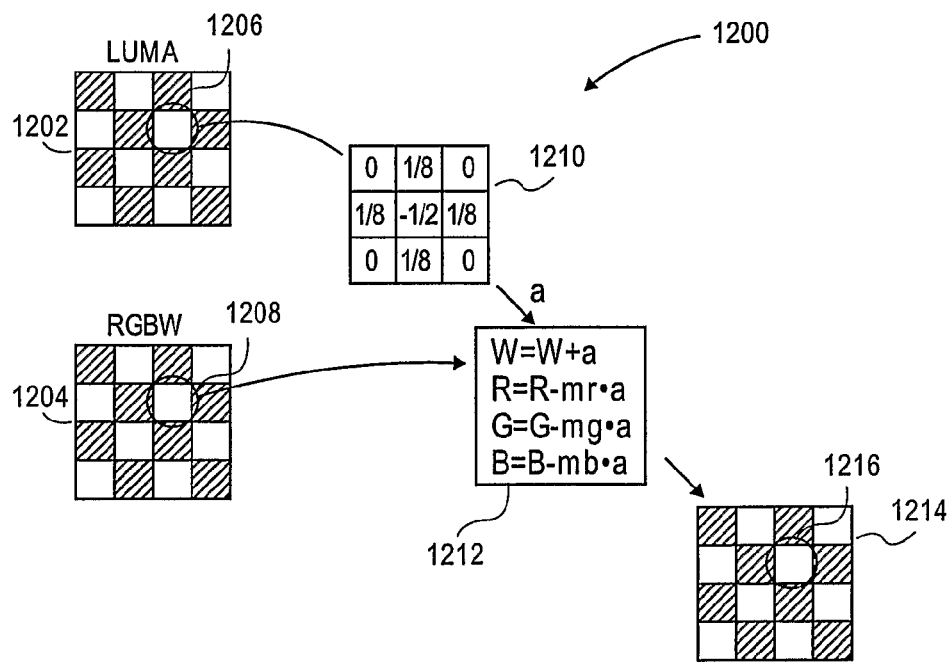
FIG. 12 shows the operation of one embodiment of metamer filtering on a second set of pixels.

In FIG. 12, the RG sub-pixel pairs are processed in a similar fashion but with the opposite filter kernel, as described above. Values centered on an RG sub pixel pair 1206 are sampled from the luminance channel 1202 and convolved with filter kernel 1210. The resulting sharpness value 'a' is used in step 1212 to calculate a new metamer for an RGBW value 1208 from the color channels 1204. The resulting new metamer 1216 is stored in output buffer 1214 or passed on to the next step of processing.

It will be appreciated that FIGS. 11 and 12 are offered for explanation purposes and that other embodiments are possible. As mentioned above, different high spatial frequency data may be obtained—other than luminance data (e.g. red and/or green color data or the like). Other filter masks could be employed to obtain different values that reflect other relationships between the metamers (e.g. non-linear relationship, or other dimensions e.g. 5×5, or the like). It will also be appreciated that the present invention is not limited to metamers in an RGBW space as depicted in FIGS. 11 and 12; but encompasses a multitude of mappings from one color space to another as discussed above. It would also be appreciated that for different sub-pixel layouts, there may be more than two subgroups of sub-pixels upon which different metamer filters would operate.

Figure 14:
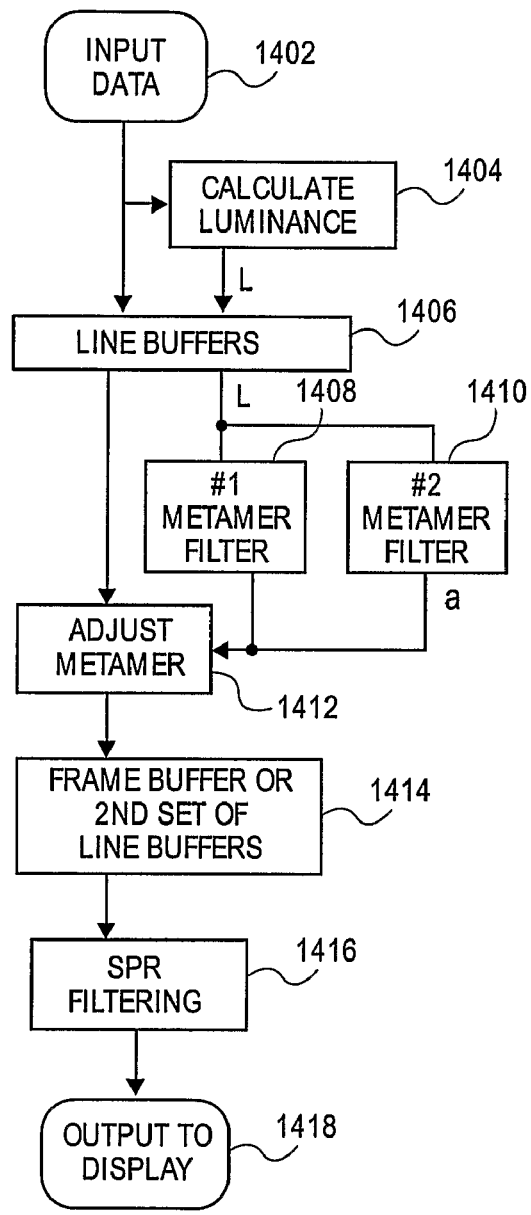
FIG. 14 shows a flowchart of one embodiment illustrating a technique discussed in the present application.
Figure 15:
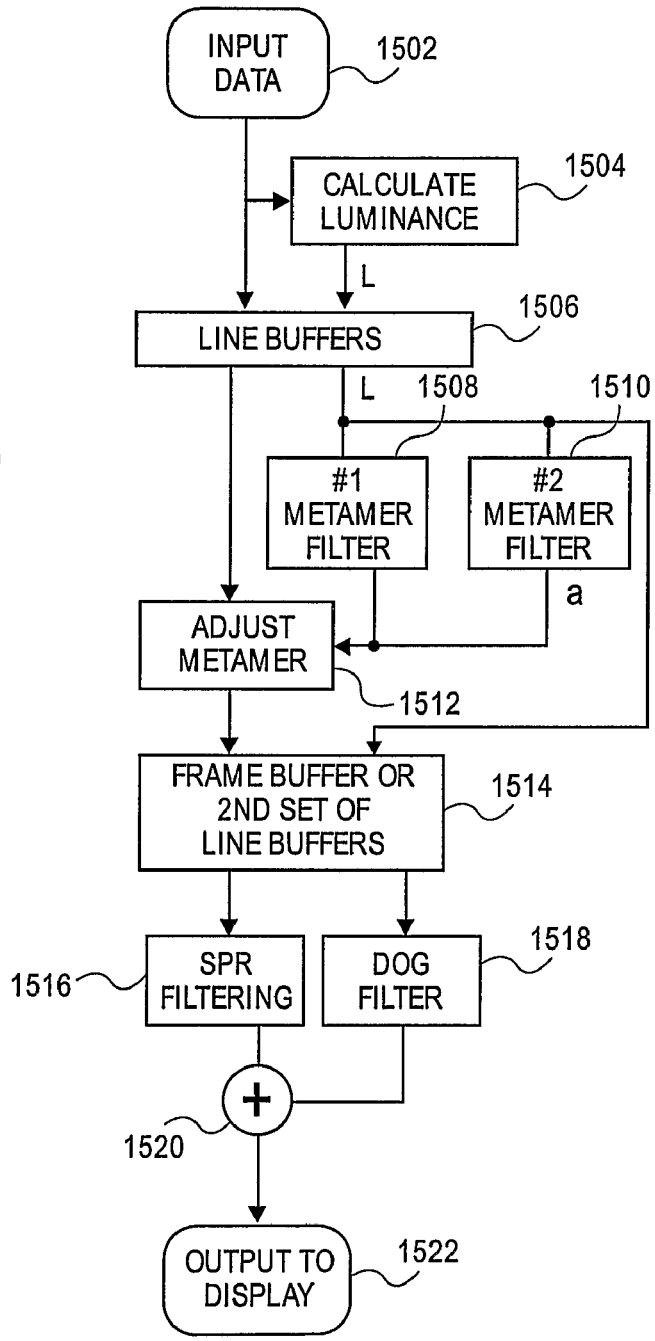
FIG. 15 shows the embodiment of FIG. 14 with the addition of Difference of Gaussian (DOG) sharpness filtering.

FIGS. 14 and 15 are other embodiments of display systems that may incorporate the techniques shown in FIGS. 11 and 12. FIG. 14 is a flowchart of the pre-conditioning metamer filtering. If not already available, luminance may be calculated in step 1404 from the input data values 1402. Both the input values and luminance values may be stored in line buffers 1406. Line buffers or some other storage device such as a frame buffer may be desirable because filtering operations may look at the surrounding values. In software implementations where memory is readily available, it may be possible to store entire images in frame buffers. In hardware implementations, it is possible to build line buffers that hold 2 or more lines of values that may suffice for the filter. Such a line buffer may use fewer gates and may thus be desirable for lowering the cost of manufacture. Line buffer 1406 supplies the surrounding luminance values to the metamer filters. As described above, one filter kernel may be used for source pixels that will eventually be converted to BW sub-pixel pairs, as shown in #1 metamer filter 1408. Also as described above, a different filter kernel, shown as #2 metamer filer 1410, may be used for input pixels that will eventually be converted to RG sub-pixel pairs. The sharpening values that result from the metamer filters is used in step 1412 to modify the metamer of input colors. Line buffer 1406 is constructed to present the RGBW value of the input data pixel that corresponds to the luminance value that is in the center of the metamer filters 1408 and 1410. Of course, BW and RG metamers for an RGBW space are all exemplary descriptions. Systems may employ different metamer filters sets—e.g. #1 Metamer Filter 1408 and #2 Metamer Filter 1410 and as many other filter sets as desired according to the input and output color spaces being mapped—as well as the topology of the target sub-pixel layout.

In the case of pre-conditioning metamer filtering, the adjusted pixel values may be stored in a second frame buffer or $2^{nd}$ set of line buffers 1414. This is a normal part of sub-pixel rendering (SPR) which is also a filtering operation and may utilize a buffer to supply the surrounding values to a filter kernel. The output from line buffer 1414 is supplied to SPR filtering step 1416 which calculates values for output display 1418.

FIG. 15 is a flowchart of pre-conditioning metamer filtering when Difference of Gaussian (DOG) sharpening is also desirable. This flowchart is similar to FIG. 14 with the following differences. In FIG. 15, the luminance values from line buffer 1506 may be also retained and stored in the second line buffer 1514. This second line buffer presents the luminance information to DOG filter 1518 at the same time that the adjusted input values are presented to SPR filter 1516. The results are summed at step 1520 before output to display at step 1522.

Metamer Filtering and Other Sub-Pixel Rendering Techniques Combined:

For another exposition and to better understand the value of this technique (i.e. without limiting the scope of the present invention), imagine that there are spatial frequency components of the luminance signal in the diagonal direction of an achromatic (i.e. black & white) image. This signal would be attenuated by the area resample SPR if the same mid-point metamer selection occurred. But in this new case, with metameric pre-filtering, the energy would be pre-sharpened and partially or completely cancel the filtering of the SPR, all without chromatic error.

Figure 5A:
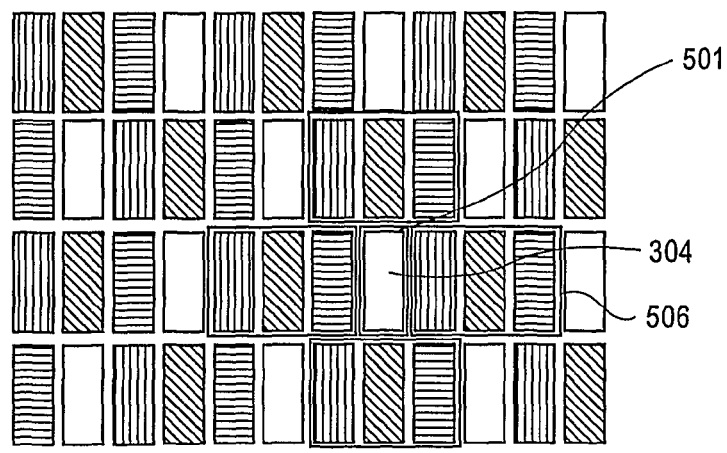
FIGS. 5A through 5F shows a section of a display comprised of the repeat cell group of FIG. 3 with 'one-pixel-to-white-sub-pixel' and 'one-pixel-to-red-green-blue-sub-pixel' mapping.
Figure 5B:
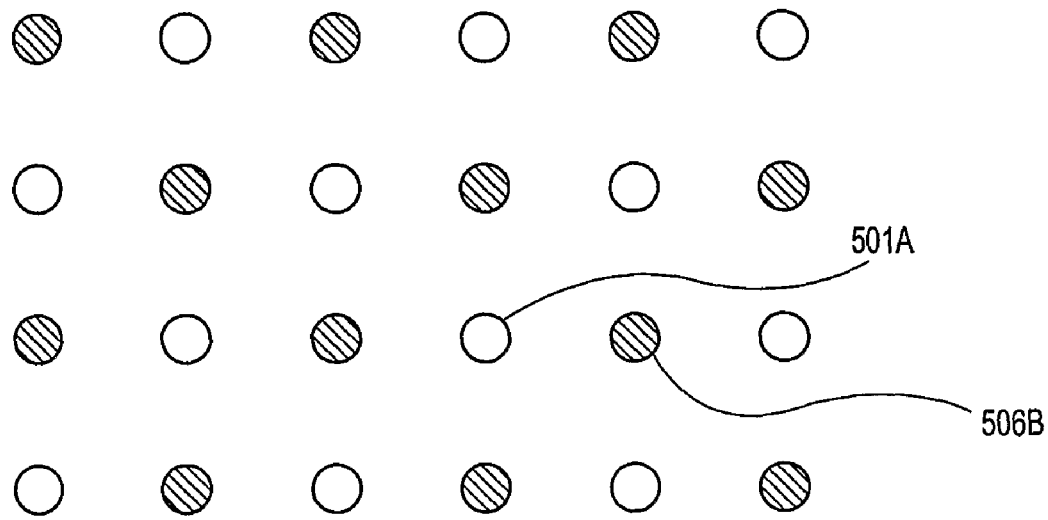
Figure 5C:
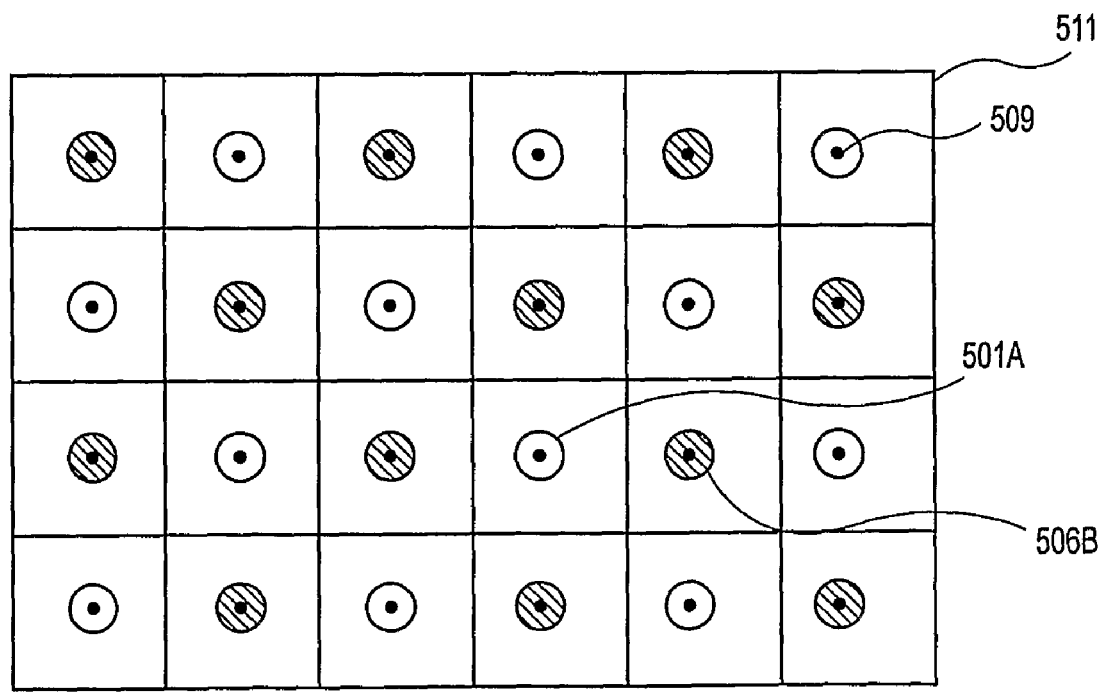
Figure 5D:
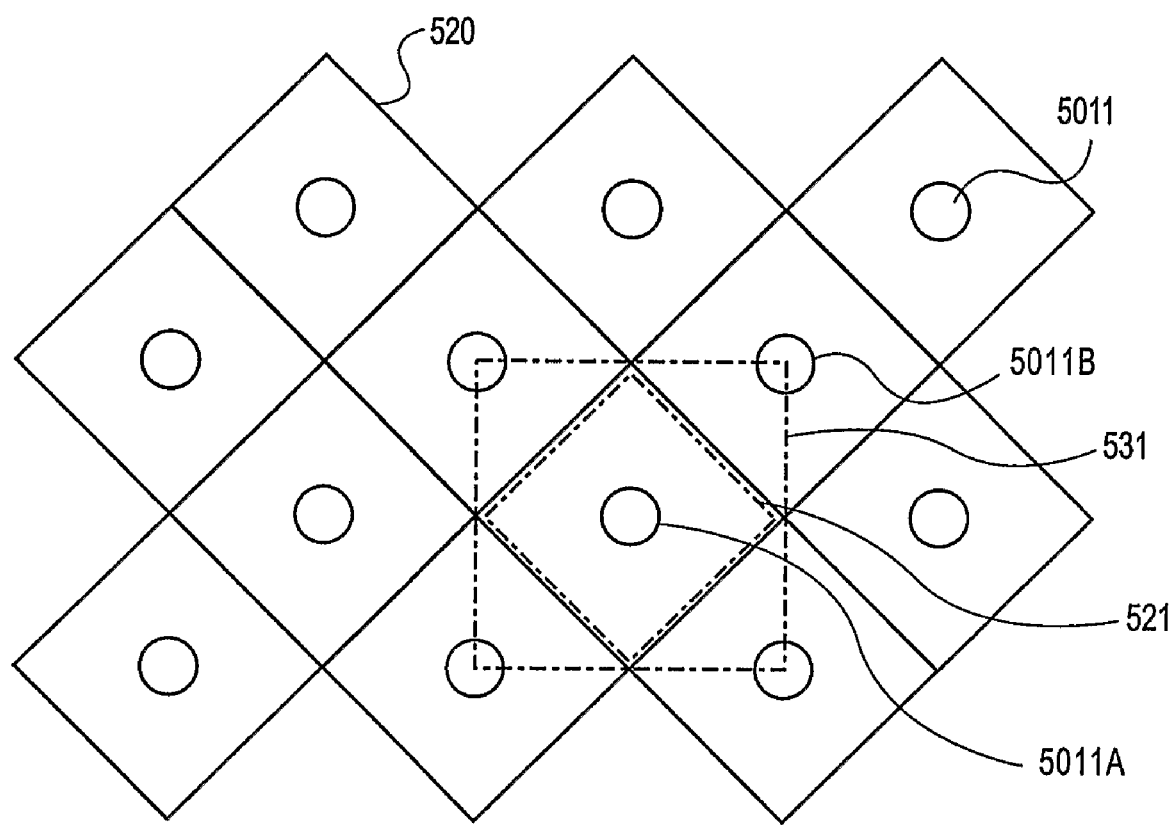

To see this advantage, it is helpful to review the techniques of area resampling and conventional sharpening filters. Area resampling and conventional sharpening filters for this layout and others are previously disclosed in "IMPROVED SUB-PIXEL RENDERING FILTERS FOR HIGH BRIGHTNESS SUB-PIXEL LAYOUTS" (US Published Patent Application 2005/0225563 herein incorporated by reference) and also in CONVERSION OF A SUB-PIXEL FORMAT DATA TO ANOTHER SUB-PIXEL DATA FORMAT (US 2003/0034992 herein incorporated by reference) and in FOUR COLOR ARRANGEMENT OF EMITTERS FOR SUB-PIXEL RENDERING (US 2004/0051724 herein incorporated by reference). Consider the arrangement of RGBW sub-pixels in FIG. 3, the red 306, green 308, and blue 310 sub-pixels are grouped 506 together, as shown in FIG. 5A, in such a manner as to be considered a single reconstruction point 506B as shown in FIG. 5B. The white 304 sub-pixel is in another group, as its sole occupant per group, considered as another reconstruction point 501A. Together, these two sets of reconstruction points 501A & 506B form a checkerboard of white vs. color reconstruction points. These reconstruction points 501A and 506B may be mapped to incoming pixels 509 with their associated implied sample areas 511 on a one-pixel-to-one-reconstruction-point basis as shown in FIG. 5C. Isolating just the white reconstruction points 5011 in FIG. 5D, one can construct area resample areas 520 associated with each reconstruction point 5011. Such a resample area 520 may be defined, in one embodiment, by the area closest to its associated reconstruction point 5011, and where the boundaries may be defined by the set of lines equidistant from other neighboring reconstruction points. Thus, a given white reconstruction point 5011A has an associated resample area 521. It also may have an associated polygonal (or other suitable shape) sharpening area 531, as defined by lines drawn between vertices at the nearest neighboring reconstruction points 5011B of the same color.

Figure 5E:
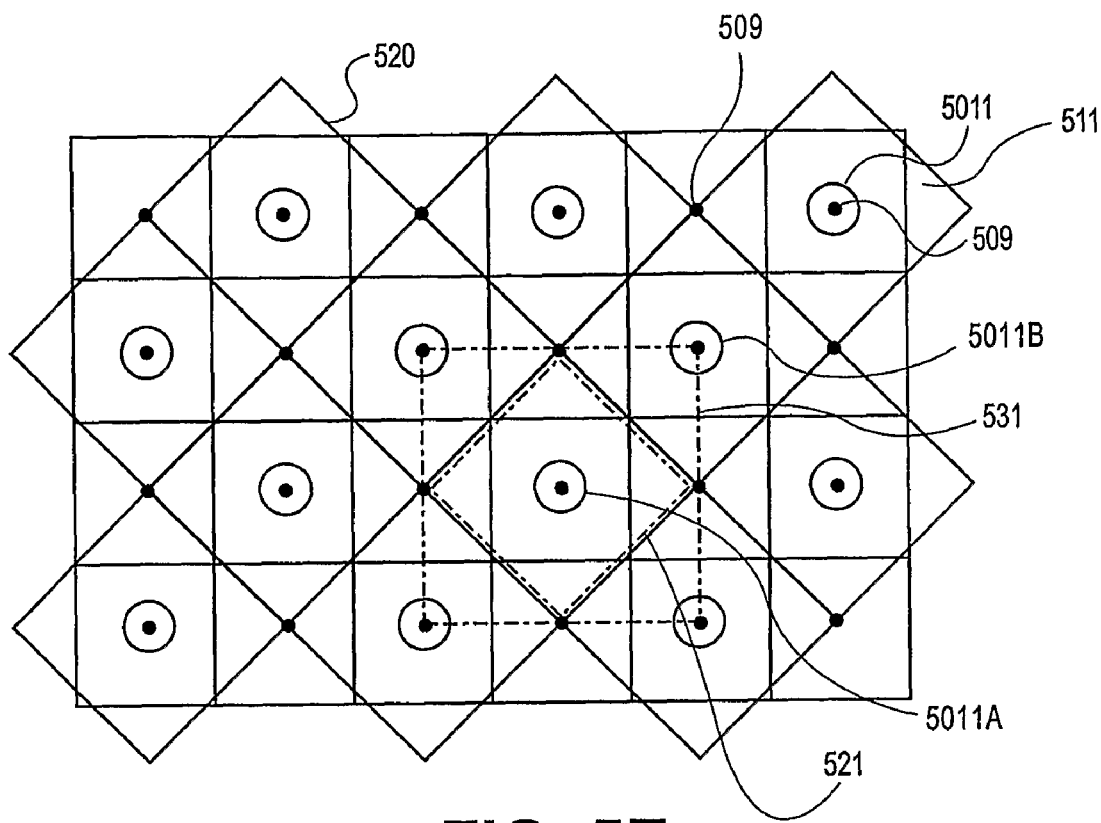

In FIG. 5E, the input pixels 509 may be mapped to the reconstruction points 5011 and resampled by the resample areas 520. A given resample area 521 associated with a given reconstruction point 5011A overlaps five input pixels 509. As disclosed in the applications mentioned above, these areas give rise to fractions of the total area to generate the area resample based filter kernel given below:

$$\begin{array}{ccc} 0 & .125 & 0 \\ .125 & .5 & .125 \\ 0 & .125 & 0 \end{array}$$

Although it is possible to generate an approximate DOG sharpening filter by inspection on such a simple example here, it is instructive to proceed using the area resample filter construction method. A given sharpening area 531 overlaps nine incoming pixels, generating the sharpening area resample filter below $$\begin{array}{ccc} .0625 & .125 & .0625 \\ .125 & .25 & .125 \\ .0625 & .125 & .0625 \end{array}$$

To calculate an approximate Difference Of Gaussians sharpening filter wavelet, the sharpening area filter kernel may be subtracted (e.g. by taking the difference) from the area resample filter kernel:

$$\begin{array}{ccc} 0 & .125 & 0 \\ .125 & .5 & .125 \\ 0 & .125 & 0 \end{array} - \begin{array}{ccc} .0625 & .125 & .0625 \\ .125 & .25 & .125 \\ .0625 & .125 & .0625 \end{array} = \begin{array}{ccc} -.0625 & 0 & -.0625 \\ 0 & .25 & 0 \\ -.0625 & 0 & -.0625 \end{array}$$

Area Resample − Sharpening Area = *DOG* Wavelet

In one embodiment, the RGBW metamer filtering may tend to pre-sharpen, or peak, the high spatial frequency luminance signal, with respect to the sub-pixel layout upon which it is to be rendered, especially the diagonally oriented frequencies, before the area resample filter blurs the image as a consequence of filtering out chromatic image signal components which may alias with the color sub-pixel pattern. The area resample filter tends to attenuate diagonals more than horizontal and vertical signals. The Difference of Gaussians (DOG) Wavelet—which may operate from the same color plane as the area resample, from another color plane, or from the luminance data plane—sharpens and maintains the horizontal and vertical spatial frequencies more than the diagonals. This exemplary DOG wavelet operation may be viewed as moving intensity values along same color sub-pixels in the diagonal directions while the metamer filtering operation moves intensity values across different color sub-pixels.

In comparison, the RGBW metamer filtering tends to sharpen the diagonals more than the horizontal and vertical signals, while area resampling tends to attenuate diagonals more than the horizontal and vertical signals. In fact, they may be proportionally complementary to each other when the RGBW metameric filter operator is set approximately to $x=0.5$. Thus, in combination they serve to render the image with the full signal energy of the original image—without the need for a DOG wavelet.

Figure 17:
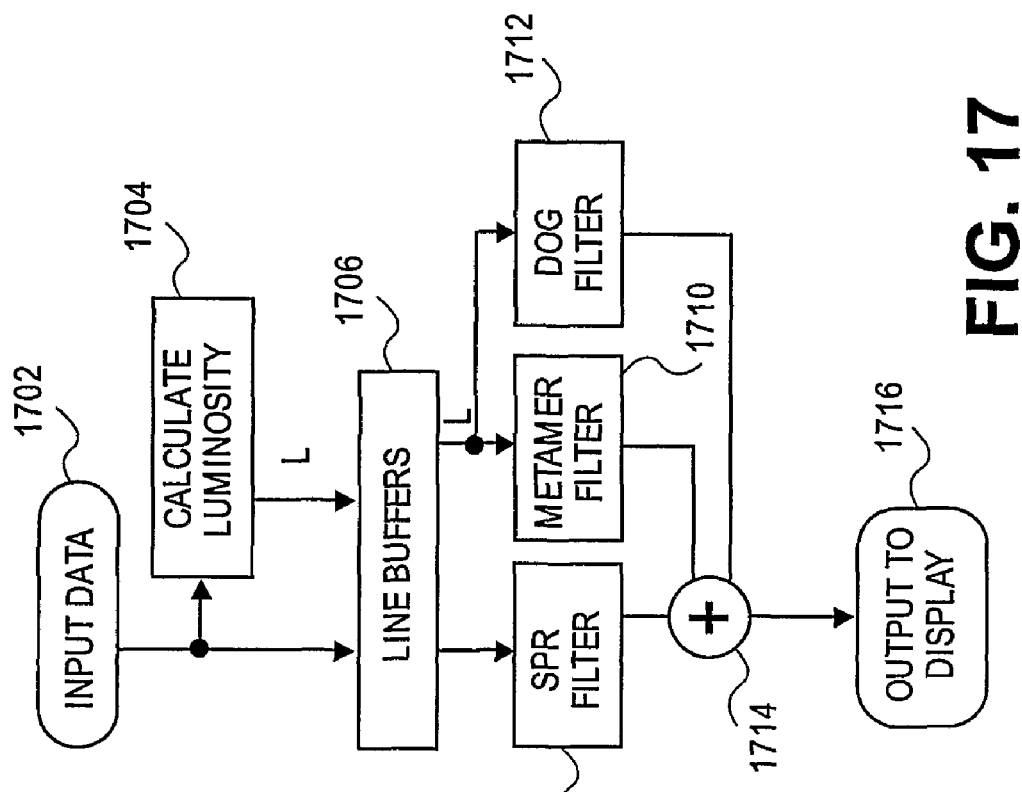
FIG. 17 shows the embodiment of FIG. 16 with the addition of DOG sharpness filtering.

However, it may be advantageous to use a DOG wavelet to further sharpen the image—e.g. as shown in FIGS. 15 and 17. One embodiment uses a DOG wavelet to increase the modulation transfer function of the less luminous primaries such that they better contribute, in proportion, to the rendering of the luminance signal. Restated with a variable in an exemplary DOG wavelet:

$$\begin{matrix} -z/4 & 0 & -z/4 \\ 0 & z & 0 \\ -z/4 & 0 & -z/4 \\ \text{DOG Wavelet} \end{matrix} + \begin{matrix} 0 & .125 & 0 \\ .125 & .5 & .125 \\ 0 & .125 & 0 \\ \text{Area Resample} \end{matrix}$$

The less luminous primaries may be sharpened with a higher amplitude DOG filter. That is to say, that the z value is higher for darker primaries. For example, the white sub-pixel is the brightest and thus could be used as the normalizing brightness. Thus the z values might be determined by:

$z_w = s(Y_w/Y_w - 1) = 0$ $z_g = s(Y_w/Y_g - 1)$ $z_r = s(Y_w/Y_r - 1)$ $z_b = s(Y_w/Y_b - 1);$ where $Y_w$, $Y_g$, $Y_r$, and $Y_b$ are the luminance values (either approximated, modeled, measured or the like) of each fully "on" white, green, red, and blue primary respectively, $z_w$, $z_g$, $z_r$, $z_b$ are the "z" values for sharpening the white, green, red, and blue sub-pixels respectively, in descending order of brightness for convenience and "s" is a scaling factor for the level of sharpening desired.

The white color plane could be sharpened along with the dimmer primaries using the DOG wavelet by replacing the constant with a number less than one.

In rendering band-limited images, it may be advantageous to interpolate values for half of the sub-pixels, taking advantage of the "extra" sub-pixel per pixel in the horizontal (higher sub-pixel density) direction using a suitable interpolation filter such as a sinc, windowed sinc, or Catmul-Rom cubic filter or other filter known now or to be later developed in the art. For example, the luminance, red, and the blue color planes may be interpolated between the original samples before being used by the above DOG wavelet and area resampling filters. The white and the green color planes would remain as before. Such filtering operations have been previously described in "IMPROVED SUB-PIXEL RENDERING FILTERS FOR HIGH BRIGHTNESS SUB-PIXEL LAYOUTS". (US Patent Application Publication 2005/0276502) and incorporated herein by reference. An example of a useful interpolation filter is the Catmul-Rom cubic filter:

−1/16  9/16  9/16 −1/16

Rather than performing the metameric filtering as a pre-conditioning step, it is possible to construct SPR so that it directly performs the metameric filtering in a single pass. For example, if one incoming pixel were mapped to a single white sub-pixel 304 as shown in FIG. 5, and the surrounding input pixels were mapped to the red, green, and blue sub-pixels as a group (e.g. group 506), centered on the green sub-pixels, then a single filter set may be used for all four color planes. As merely for example, shown below is a set of such direct filters where the metameric filter coefficient $x=0.5$:

Area Resampling the Self Color Plane:

$$\begin{matrix} 0 & .125 & 0 \\ .125 & .5 & .125 \\ 0 & .125 & 0 \end{matrix} +$$

Sampling the Luminance Plane:

$$\begin{matrix} 0 & -.125 & 0 \\ -.125 & .5 & -.125 \\ 0 & -.125 & 0 \end{matrix}$$

Figure 5F:
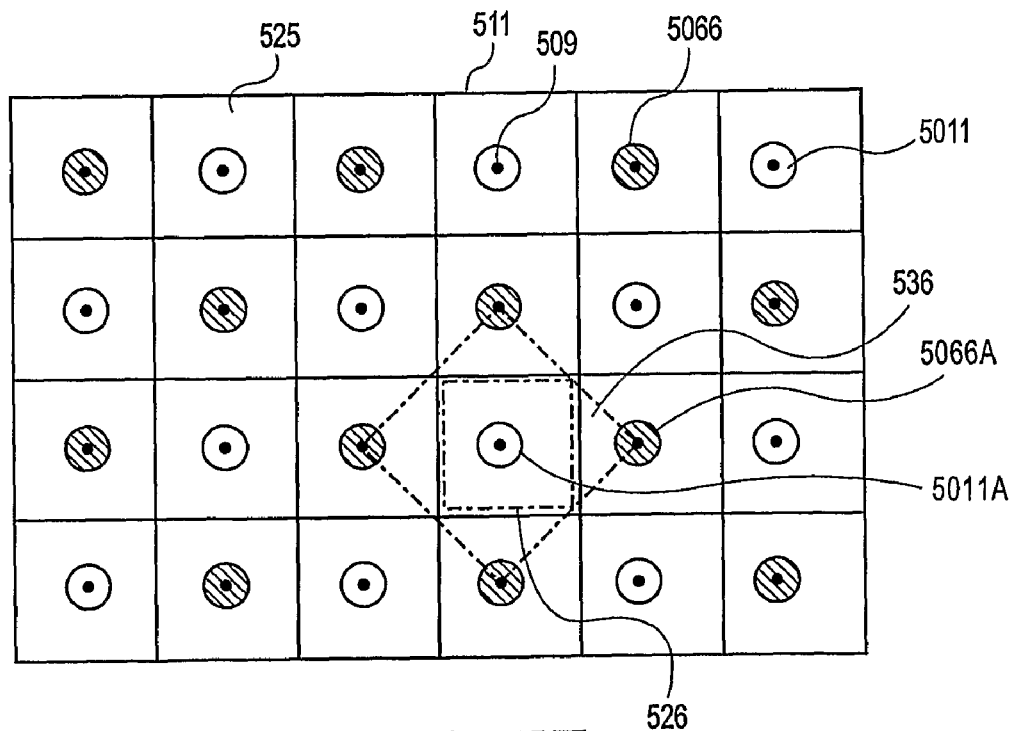

Although it is possible to generate an approximate metameric sharpening filter by inspection on such a simple example here, it is instructive to proceed using the area resample filter construction method. In FIG. 5F, the white 5011 and color 5066 luminance reconstruction points are shown overlain on the incoming pixels 509 and their associated implied sample areas 511. The luminance resample areas 525 substantially coincide with the implied sample areas 511 of the incoming pixels 509. A given reconstruction point, in this example, a white reconstruction point 5011A, has an associated luminance sample area 526, substantially coincident with an implied sample area 511 of an incoming pixel 509. Thus, the luminance sample area overlaps substantially one implied sample area and results in an approximate unity filter with a value of one (1). As shown, luminance reconstruction point 5011A may also have an associated polygonal metameric sharpening sample area 536 defined by lines with vertices at the nearest neighbors of the opposite metamer exchange reconstruction points 5066A. This metameric sharpening sample area overlaps five implied pixel sample areas 511, generating the filter kernel below. To calculate the direct metameric filter kernel, the metameric sharpening area filter kernel may be subtracted from the luminance sample area filter kernel:

$$\begin{matrix} 0 & 0 & 0 \\ 0 & 1 & 0 \\ 0 & 0 & 0 \end{matrix} - \begin{matrix} 0 & .125 & 0 \\ .125 & .5 & .125 \\ 0 & .125 & 0 \end{matrix} = \begin{matrix} 0 & -.125 & 0 \\ -.125 & .5 & -.125 \\ 0 & -.125 & 0 \end{matrix}$$

Area Resample − Sharpening Area = Metamer Sharpening Wavelet

It should be noted that a similar behavior occurs in the direct method and the metameric filter preconditioning, when an incoming pixel value (as 501) is mapped to white sub-pixel 304 and the incoming pixel value has more brightness than its surrounding pixels 506, the white sub-pixel 304 gets brighter, etc. The two methods may not produce identical results however. The result of the preconditioning operation followed by sub-pixel rendering is a convolution of the two operations. The output intensity value of a given sub-pixel is affected by the input luminance value of pixels that surround the four nearest neighbors. While the direct metameric filtering operation does not exhibit this behavior. This suggests that the metameric preconditioning filter method may be suited to band-limited images while the direct method is suitable for both band-limited and non-band-limited images, performing particularly well on black on white text when the metameric filter operator is set to x=0.5 as shown above. As before, other values for the operator are possible.

It is also possible to construct a direct metameric filter that maps the white and blue sub-pixel to the same incoming pixel as a group. However, when this is done, the metameric filter may have the reverse sign as shown below. This may have the effect of blurring the blue image component. This may be reversed with a high amplitude sharpening DOG wavelet added to the self-color area resampling filter also shown below. The red, green, and white color planes continue to be filtered as above.

Sampling the Self Color Plane:

| −.125 | .125 | −.125 |
|---|---|---|
| .125 | 1 | .125 |
| −.125 | .125 | −.125 |

+

Sampling the Luminance Plane

| 0 | .125 | 0 |
|---|---|---|
| .125 | −.5 | .125 |
| 0 | .125 | 0 |

Figure 16:
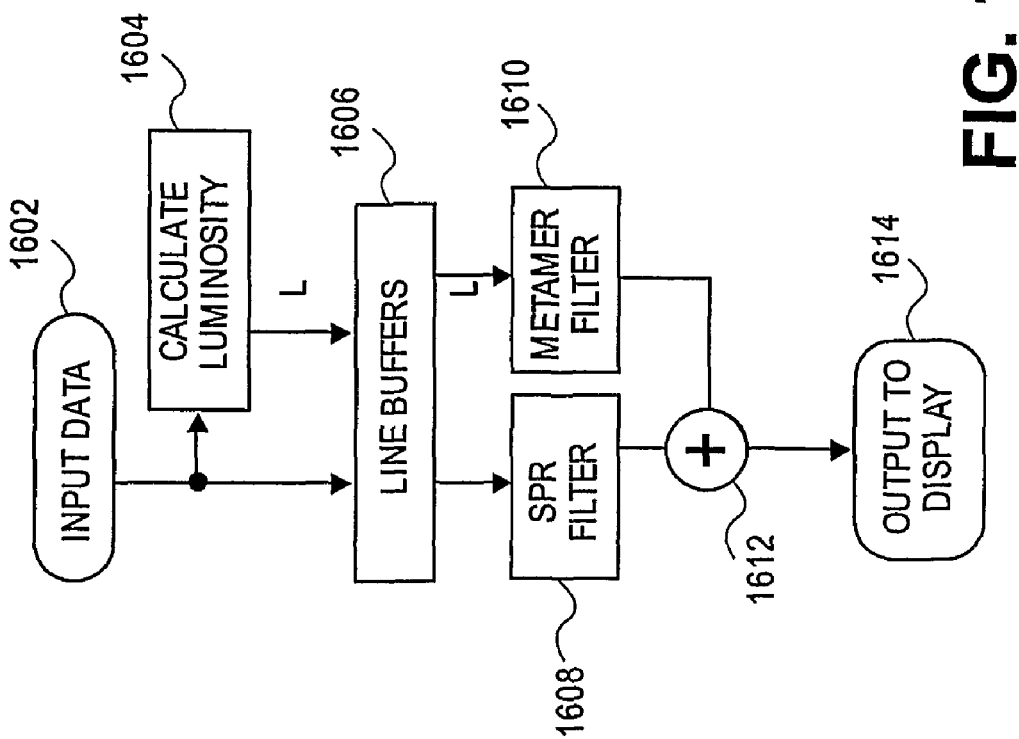
FIG. 16 shows a flowchart of a second embodiment of the present invention.

FIGS. 16 and 17 are two embodiments of systems that combine the features of metamer filtering with sub-pixel rendering—called direct metamer filtering for the purposes of this application. In FIGS. 14 and 15, it can be seen that two frame buffers or line buffers are described. Both of these line buffers are intended for holding and organizing information to supply the values needed for a filtering operation. However, in direct metamer filtering, the two filtering operations are combined together and only one line buffer or frame buffer may suffice. This results in a significant savings of memory requirements in software implementations or a significant savings of gates in hardware implementations. In addition, only one metamer filter kernel is necessary instead of a separate one for BW vs. RW pairs of output sub-pixels. FIG. 16 shows this embodiment. If they are not already available from previous steps, luminance values are calculated in step 1604 from input pixel values 1602. The input values and luminance values are stored in line buffers 1606. Line buffers 1606 present the color input values to the SPR filter 1608 and the luminance information to metamer filter 1610. The results from the two filters is summed at step 1612 and sent to the output display 1614 or sent to the next step in processing.

FIG. 17 shows the direct metamer filtering algorithm of FIG. 16 with the addition of DOG filtering when additional sharpening of the image is desirable. The luminance values from line buffer 1706 are used in an additional DOG filter step 1712. The output from this DOG filter 1712 is summed with the output from SPR filter 1708 and metamer filter 1710 in the summing step 1714. The result of summer 1714 is sent to output display 1716 or to the next processing step. In another embodiment, it may be possible to combine metamer filter 1710 and DOG filter 1712 into one pre-calculated filter kernel.

For another embodiment, the layout in FIG. 6 has one white 604 sub-pixel per repeat cell 620 of six sub-pixels (i.e. comprising red 606, green 608, blue 610 and white 604 sub-pixels as shown). The white 604 sub-pixel is in half of the rows, the RWG rows 625, while a single blue sub-pixel is found on the other rows, the GBR rows 635. To offset or reverse the blurring effect of the area resample filter on the white 604 sub-pixel, a direct metameric filter may be constructed:

Sampling the White Color Plane:

| −.015625 | .140625 | .140625 | −.015625 |
|---|---|---|---|
| −.03125 | .28125 | .28125 | −.03125 |
| −.015625 | .140625 | .140625 | −.015625 |

+

Sampling the Luminance Plane

| −.125 | −.125 |
|---|---|
| .25 | .25 |
| −.125 | −.125 |

The white plane may be sampled with an area resample filter that has been modified to have Catmul-Rom cubic type interpolation in the horizontal axis. For band-limited images, this interpolation increases the image quality, taking advantage of the white 604 sub-pixel's interstitial position between the red/green columns on either side. The luminance plane may be sampled with a direct metameric filter, concentrating intensity in the white sub-pixel when the pixels mapped to the RWG row 625 have more luminance than the two GBR rows 635 above and below said RWG row 625, etc. The red 606 and green 608 sub-pixels in the RWG row 625 do not use a metameric filter:

Area Resampling the Self Color Plane:

| 0 | .125 | 0 |
|---|---|---|
| .125 | .5 | .125 |
| 0 | .125 | 0 |

+

Sampling the Luminance Plane:

| −.0625 | 0 | −.0625 |
|---|---|---|
| 0 | .25 | 0 |
| −.0625 | 0 | −.0625 |

The above filter is an area resample filter with a DOG sharpening filter. While the red 606 and green 608 sub-pixels in the RWG rows 625 do not have metameric filters, the red 606 and green 608 in the GBR rows 635 do. The red 606 sub-pixel filter may be as follows:

Area Resampling the Red Color Plane:

| 0 | .125 | 0 |
|---|---|---|
| .125 | .5 | .125 |
| 0 | .125 | 0 |

+

Sampling the Luminance Plane:

| −.125 | −.0625 | −.0625 |
|---|---|---|
| .125 | .375 | 0 |
| −.125 | −.0625 | −.0625 |

The green 608 sub-pixel filter may be as follows:

Area Resampling the Green Color Plane:

$$\begin{bmatrix} 0 & .125 & 0 \\ .125 & .5 & .125 \\ 0 & .125 & 0 \end{bmatrix} +$$

Sampling the Luminance Plane:

$$\begin{bmatrix} -.0625 & -.0625 & -.125 \\ 0 & .375 & .125 \\ -.0625 & -.0625 & -.125 \end{bmatrix}$$

Examination and comparison of the two filters sampling the luminance plane will reveal that the second filter is a DOG sharpening filter with a metameric filter added. This metameric filter is the counter part to the white sub-pixel metameric filter.

The blue 610 sub-pixel present two choices. Strictly speaking, it should have the counterpart filter to the white 604 sub-pixel, using the exact same metameric filter. For band-limited images, this is the best choice to ensure color accuracy. However, for non-band-limited images, especially black text on white, the blue 610 sub-pixel should represent the blue component of the rows 625 above and below as well as in line 635, it has been found experimentally that it need not use the metameric filter, leaving the blue image "fuzzy", which matches the lower resolution of the human vision system, and that for non-band-limited images, the image has less color error without the metameric filter.

With metameric filtering on this layout in FIG. 6, horizontally oriented lines and spaces appear sharper, but vertically aligned lines and spaces may still appear to be "fuzzy" and "dotty". A simple technique while not being a metameric operation, may improve the appearance of vertically orientated lines and spaces. Just as metameric filters are directed by the local entropy and sign of the luminance signal at a point in the image to select a better metamer at that point, this contrast improvement procedure measures the entropy, regardless of the sign, to push down the intensity of the white sub-pixel. This may have the tendency to increase the contrast of black on white text and of natural images, an a manner similar that explained in detail in the application entitled "METHODS AND SYSTEMS FOR SUB-PIXEL RENDERING WITH GAMMA ADJUSTMENT". The equation is:

$W = W - |(Lr - Lg)/2|$ where Lr and Lg are the luminance values of the pixel mapped to the red 606 sub-pixel and the green 608 sub-pixel on either side of the white 604 sub-pixel respectively.

In the RGBW system, one possible metameric degree of freedom is W vs. RGB. In other four color systems such as RGBC, where the primaries are red, green, blue, and cyan respectively there is also one possible degree of metameric freedom that is roughly RC vs. GB. Another four color system may be RGCM, where the primaries are red, green, cyan, and magenta respectively; there is one possible degree of freedom that is RC vs. GM. Another four color system would be RGBY, where the primaries are red, green, blue and yellow respectively, where one possible degree of metameric freedom is roughly RG vs. Y. Other metameric pairs and degrees of freedom are also possible as well.

In all of the figures presented herein, such additional sub-pixel layouts may be obtained by replacing all or some of the white sub-pixels with either cyan, yellow, grey or other colors, as the case may be. In particular, the techniques of the present invention may be employed with the layout of FIGS. 2, 3, 4, 5, 6, 9A and 10 with all or some of the white sub-pixels with either cyan, yellow, grey or other colors. In addition, the techniques of the present invention encompasses the scope of all manners of display technologies, including transmissive and non-transmissive display panels, such as Liquid Crystal Displays (LCD), reflective Liquid Crystal Displays, emissive ElectroLuminecent Displays (EL), Plasma Display Panels (PDP), Field Emitter Displays (FED), Electrophoretic displays, Iridescent Displays (ID), Incandescent Display, solid state Light Emitting Diode (LED) display, and Organic Light Emitting Diode (OLED) displays.

A five color system such as RGBCW, where the primaries are red, green, blue, cyan, and white respectively, there are two possible degrees of metameric freedom that is roughly RC vs. GB and W vs. RGBC. A six color system such as RGBCYM, where the primaries are red, green, blue, cyan, yellow, and magenta have even more degrees of freedom such as RC vs. YB vs. GM and RGB vs. CYM. One can imagine any arbitrarily high number N of primaries in a display which may give N−3 degrees of freedom to select a metamer. Each degree of freedom in a multiprimary system is an opportunity for a metameric filter, either for metameric preconditioning or direct metameric filtering to be constructed and used to improve the sub-pixel rendering system.

Figure 8:
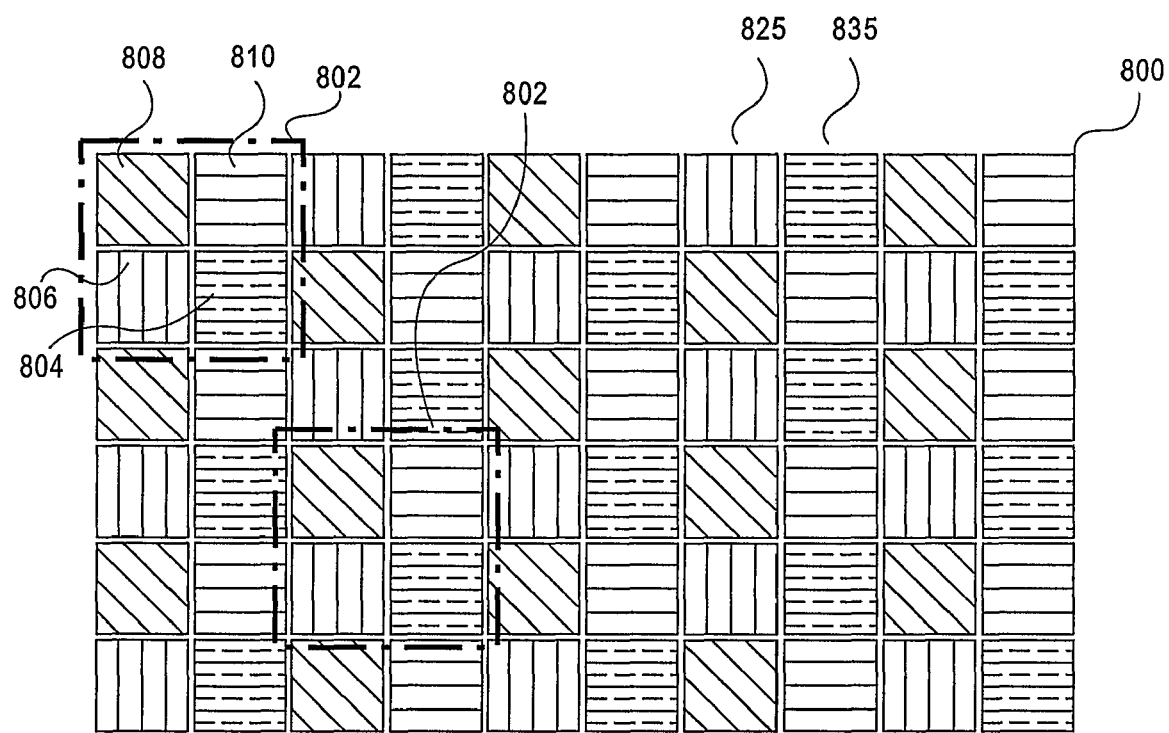
FIG. 8 shows a section of a display comprised of eight sub-pixel repeat cell groups comprising four primaries in which the sub-pixel are substantially square.
Figure 9A:
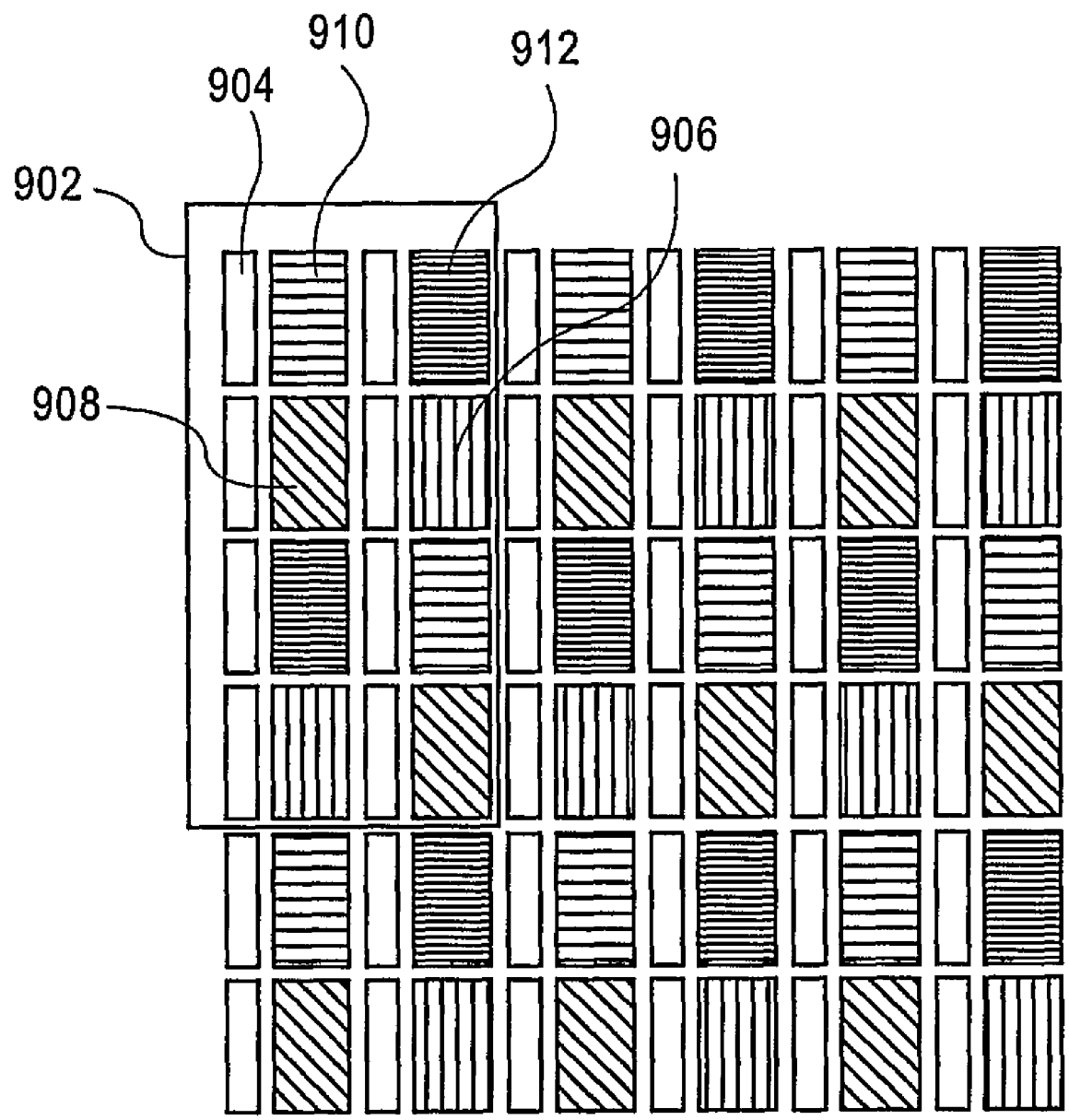
FIG. 9 shows section of a display with an arrangement of sub-pixels comprising five primaries, four of which lie in a lower resolution hexagonal grid.
Figure 9B:
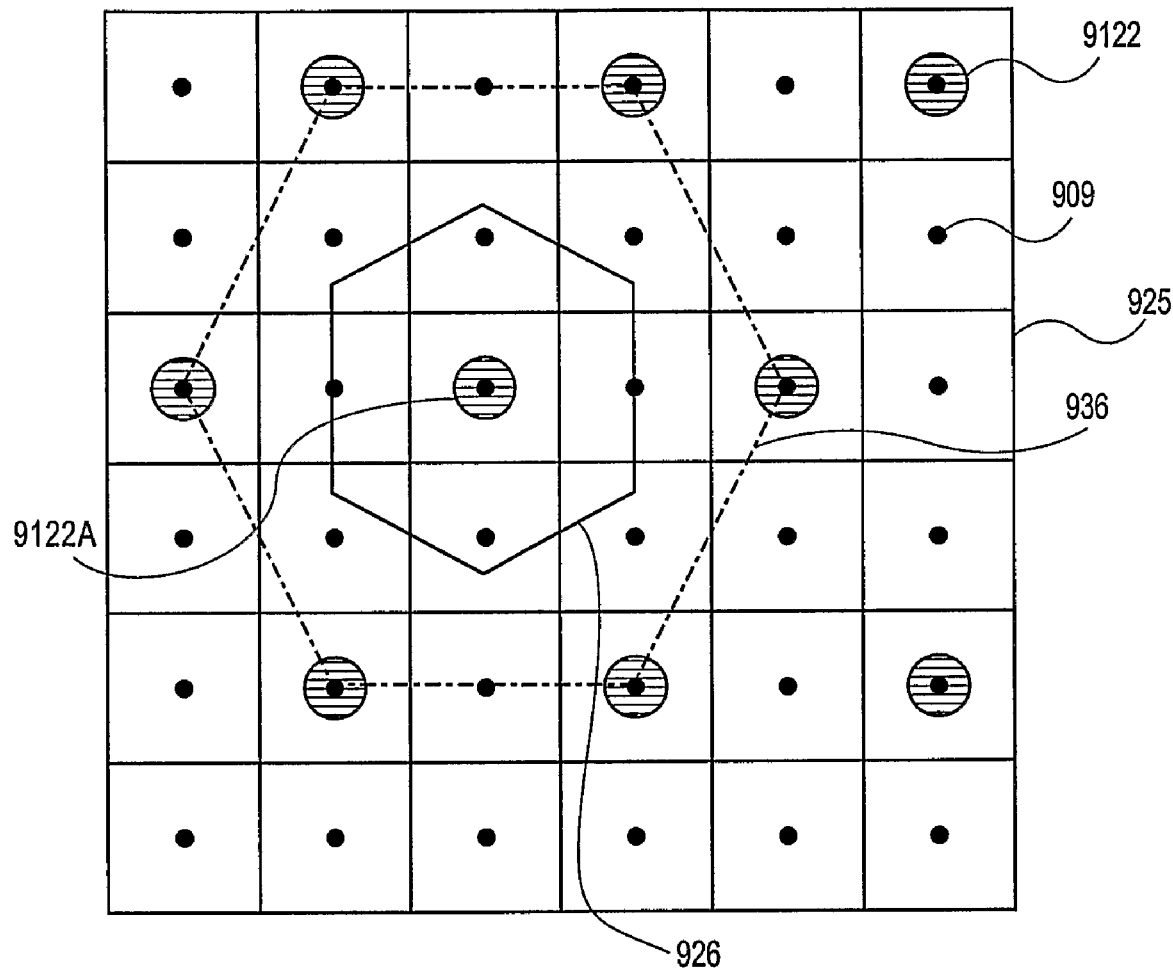

In FIG. 8, a square group of four sub-pixels 802 is shown, comprised of four primaries. In this arrangement, each primary is on a hexagonal grid with the same relationship of neighboring primaries. If the primaries are chosen such that each column has a pair of primaries that are exactly or roughly metameric pairs with the alternating columns, then the construction of a metameric filter, either sequential metameric filter preconditioning or direct metameric filtering type, may proceed as follows.

First, determine the Area Resample and DOG filters for the layout, using the methods that have been disclosed in the above listed prior applications to create an approximate filter set. For one embodiment, it may be:

Area Resampling the Self Color Plane:

$$\begin{bmatrix} .0625 & .125 & .0625 \\ .125 & .25 & .125 \\ .0625 & .125 & .0625 \end{bmatrix} +$$

Difference of Gaussians:

$$\begin{bmatrix} 0 & 0 & -z/6 & 0 & 0 \\ -z/6 & 0 & 0 & 0 & -z/6 \\ 0 & 0 & z & 0 & 0 \\ -z/6 & 0 & 0 & 0 & -z/6 \\ 0 & 0 & -z/6 & 0 & 0 \end{bmatrix}$$

The DOG filter above may be generated from simple examination. As before, the DOG filter may sample either the self color plane, another color plane, or the luminance plane, as the DOG filter transfers signal intensities between same color sub-pixels. The value of "z" may be adjusted per color as explained earlier, with the brightest primary serving as a reference.

Examining the layout 800 in FIG. 8 for a metamer filter, it should be noted that the colors in each column 825 and 835 may move together as the metamers are adjusted. Thus, moving energy along a column 825 and 835 does not provide as much value as moving energies from the neighboring columns. Thus, the metamer filter may be as shown here:

−x/6 0 −x/6
−x/3 x −x/3
−x/6 0 −x/6

The result of this filter may be used to adjust the values directly as a metameric filter, perhaps combined with the DOG filter above, if the metamers have the same coefficients such as for RGCM primaries, or used to push the metamer values in a metameric filter preconditioning operation before sub-pixel rendering by the Area Resample+DOG filter above if the metamer coefficients are not the same, such as for RGBC primaries. Of course the indirect, preconditioning method would change the signs for the filters for each alternating column 825 and 835.

Figure 10:
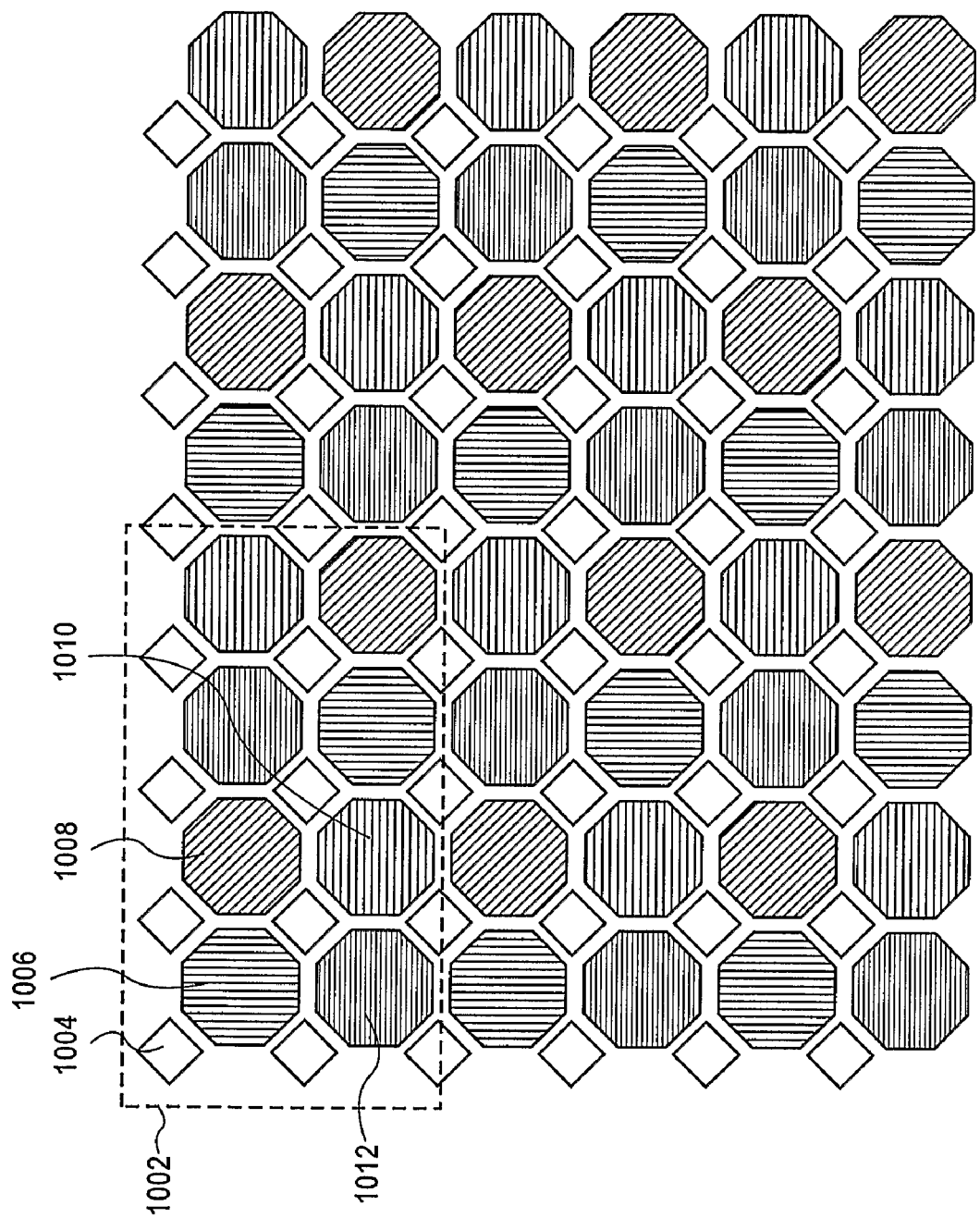
FIG. 10 shows section of a display with an arrangement of sub-pixels comprising five primaries, four of which lie in a lower resolution hexagonal grid.

Examining FIG. 2 (with repeating group 202 comprising white 204, red 206, green 208, blue 210 and fifth color 212) and FIG. 10 (with repeating group 1002 comprising white 1004, red 1006, green 1008, blue 1010 and fifth color 1012) we note that there are five primaries, with four of them at a lower resolution on the same hexagonal grid as the four primaries in FIG. 8. FIG. 9 (with repeating group 902 comprising white 904, red 906, green 908, blue 910 and fifth color 912) has an arrangement similar to FIG. 2 save that the four lower resolution primaries are arranged in rows instead of columns. Each of these layouts in FIGS. 2, 9, and 10, may use similar sub-pixel rendering and metameric filters for the lower resolution primaries as just described for the layout shown in FIG. 8, with allowance made for rotation of the filters for FIG. 9. However, in these layouts, an additional, higher resolution primary is present (e.g. 204, 904, 1004). This additional primary may be a bright color primary such as yellow, white, or grey.

Although it is possible to generate an approximate DOG sharpening filter for a hex arrangement of saturated color sub-pixels by inspection or examination as was done above, it is instructive to proceed using the strict area resample filter construction method. Examining FIG. 9B, which shows the one of the saturated color primary reconstruction points 9122 overlain and mapped on an array of pixels 909 and their implied sample areas 925. A given saturated primary reconstruction point 9122A has associated resample area 926 and sharpening area 936, generating the following filter kernels:

$$\begin{matrix} 0 & 0 & 0 & 0 & 0 \\ 0 & 12 & 40 & 12 & 0 \\ 0 & 32 & 64 & 32 & 0 \\ 0 & 12 & 40 & 12 & 0 \\ 0 & 0 & 0 & 0 & 0 \end{matrix}$$

Area Resample

Note: Coefficients divided by 256

$$\begin{matrix} 0 & 7 & 11 & 7 & 0 \\ 1 & 20 & 21 & 20 & 1 \\ 8 & 21 & 22 & 21 & 8 \\ 1 & 20 & 21 & 20 & 1 \\ 0 & 7 & 11 & 7 & 0 \end{matrix} = \begin{matrix} 0 & -7 & -11 & -7 & 0 \\ -1 & -8 & 19 & -8 & -1 \\ -8 & 11 & 42 & 11 & -8 \\ -1 & -8 & 19 & -8 & -1 \\ 0 & -7 & -11 & -7 & 0 \end{matrix}$$

Sharpening Area = DOG Wavelet

As noted earlier, a five primary display may have additional degrees of freedom in which to select a metamer to best render a given image at the sub-pixel level. Assuming that these layouts are RGBCW systems, there are two degrees of freedom available, W vs. RGBC and RC vs. GB. Both degrees of freedoms may be used in the same image to improve rendering accuracy. For merely one example, assume that a vertically oriented line of a pastel color, that is to say, not white but still substantially de-saturated is to be rendered onto a dark grey background onto the display of either FIG. 2 or FIG. 10. In that case, the desired metamer may maximize the intensity of the white plane on the line and reduce it on either side, in response to a W vs. RGBC metameric filter. Further, the desired metamer may maximize the intensity of the metameric pair in a column, either RC or GB, upon which the bright vertical line is to be drawn and reduce the intensity of the columns on either side, in response to an RC vs. GB metameric filter.

The W vs. RGBC metameric filter preconditioning operation proceeds similarly to that described earlier for the W vs. RGB system:

Samples the Luminance Plane:

$$\begin{matrix} -x/8 & -x/8 & -x/8 \\ -x/8 & x & -x/8 \\ -x/8 & -x/8 & -x/8 \end{matrix} = a$$

Then modifies the RGBCW values of each pixel:

$W=W+a;$ $R=R-a;$ $G=G-a;$ $B=B-a;$ $C=C-a$

And samples the luminance plane for the RC vs. GB metamers:

R and C mapped pixels    G and B mapped pixels $$\begin{matrix} -x/6 & 0 & -x/6 \\ -x/3 & x & -x/3 \\ -x/6 & 0 & -x/6 \end{matrix} \quad \begin{matrix} x/6 & 0 & x/6 \\ x/3 & -x & x/3 \\ x/6 & 0 & x/6 \end{matrix} = a$$

Then modifies the RGBCW values of each pixel:

$W=W;$ $R=R+a*mr;$ $G=G-a*mg;$ $B=B-a*mb;$ $C=C+a*mc$ where mr, mg, mb, and mc are metameric 'm' slope coefficients, explained below, that scale the effect of the value of "a" for each color, red, green, blue, and cyan respectively to maintain the desired color through the metameric adjustment.

It should be noted that in one set of formula above where the W primary is changed, there may be no metamer slope terms. When modifying the W vs the color primaries, this may be treated as another special case where the metamer slope terms all simplify to plus or minus one if the correct assumptions can be made, as described in the section above about calculating metamers.

These operations are commutative, meaning they can be done in either order. After the metamer precondition, the data may be sub-pixel rendered. The white sub-pixel planes are sampled to the fully one-pixel-to-one-white-sub-pixel mapped layout using a unity filter, a 1×1 array with the single filter coefficient value of one (1). The lower resolution colored primaries on a hexagonal grid may be area resampled and sharpened with a DOG using the filters disclosed earlier. Further, since the colored sub-pixels are displaced at interstitial points, it may be advantageous for rendering band-limited images using a suitable interpolating reconstruction filter, such as those discussed above. The layouts of FIGS. 2 and 9 may use a single horizontally oriented Catmul-Rom cubic filter, while the layout in FIG. 10 may use a Catmul-Rom bicubic filter, either as an axis separable operation or as a convolved operation, as is understood in the art, on the color data planes to shift the phase of the reconstructed image before the sub-pixel rendering.

Examining FIG. 7, the layout 700 shown is comprised of a six sub-pixel repeat cell 701 of six primaries, RGBCMY; substantially red 706, green 708, blue 710, cyan 707, magenta 709, and yellow 711 respectively. This collection of primaries exhibits a number of degrees of freedom as discussed above; RC vs. GM vs. BY and RGB vs. CMY. In this example, the three sets of pairings of two colors that form dichromatic metamers for white are arranged in columns; red 706 and cyan 707 are in a first column 726, green 708 and magenta 709 are in a second column 728, and blue 710 and yellow 711 is in a third column 730. The two sets of trichromatic metamers for white are arranged in columns; red 706, green, 708, and blue 710 are in a first row 725, and cyan 707, magenta 709, and yellow 711 are in a second row 735. These columns and rows are repeated across a display as many times as are desired to complete a given desired resolution panel, as known in the art. An additional feature is that the sizes of the sub-pixels may be adjusted such that the two trichromatic pairs for white are substantially the same luminance. In this example, the red 706, green 708, and blue 710 are twice as tall as the cyan 707, magenta 709, and yellow 711 as these colors generally are half the luminance when constructed as filters over a broad spectrum emitter or reflector as is found in backlit Liquid Crystal Displays, reflective Liquid Crystal Displays, and filtered white emitting Organic Light Emitting Diode displays (OLED). Other display technologies may exhibit other ratios and may be adjusted accordingly as desired. This feature allows each row 725 and 735 to render a white horizontal line with equal luminance. It should also be noted that the dichromatic metameric pair in the columns 726, 728, and 730 may also exhibit equal luminance, allowing each said column to render a vertical line with equal luminance.

One-Pixel-to-One-Sub-pixel rendering filters for the layout 700 may be constructed as:

Area Resampling the Self Color Plane:

$$\begin{matrix} 1/12 & 1/12 & 1/12 \\ 1/6 & 1/6 & 1/6 \\ 1/12 & 1/12 & 1/12 \end{matrix}$$

The RGB vs. CMY metameric preconditioning filters, sampling the luminance (L) plane may be constructed:

$$\begin{matrix} RGB \text{ Rows } 725 & & CMY \text{ Rows } 735 \\ -x/6 & -x/6 & -x/6 & & x/6 & x/6 & x/6 \\ x/3 & x/3 & x/3 & & -x/3 & -x/3 & -x/3 & = a \\ -x/6 & -x/6 & -x/6 & & x/6 & x/6 & x/6 \end{matrix}$$

Then modifies the RGBCMY values of each pixel:

$R=R+a$ $G=G+a$ $B=B+a$ $C=C-a$ $M=M-a$ $Y=Y-a$

The RC vs. GM vs. BY metameric preconditioning filters, sampling the luminance (L) plane may be constructed:

$$\begin{matrix} 0 & x/4 & -x/4 & & -x/4 & x/4 & 0 \\ 0 & x/2 & -x/2 & = d & -x/2 & x/2 & 0 & = e \\ 0 & x/4 & -x/4 & & -x/4 & x/4 & 0 \end{matrix}$$

Then modifies the RGBCMY values of each pixel mapped to the RC columns 726:

$R=R+d+e$ $G=G-d$ $B=B-e$ $C=C+d+e$ $M=M-d$ $Y=Y-e$

Then modifies the RGBCMY values of each pixel mapped to the GM columns 728:

$R=R-e$ $G=G+d+e$ $B=B-d$ $C=C-e$ $M=M+d+e$ $Y=Y-d$

Then modifies the RGBCMY values of each pixel mapped to the BY columns 728:

$R=R-d$ $G=G-e$ $B=B+d+e$ $C=C-d$ $M=M-e$ $Y=Y+d+e$

As before, the values of 'x' may be adjusted as desired. It should be noted that there may be no need of slope value in order to create metamers. This is the result of the additional feature that the sizes of the sub-pixels 707, 709 and 711 were adjusted such that the two trichromatic pairs for white are substantially the same luminance. Of course, if the sub-pixels were of equal size and/or dimension, appropriate slope values could be created in accordance with the principles and techniques described herein.

In some applications, wherein this present invention may find use, the Gamut Mapping function may have already been performed by an another component or system; or the multiprimary image may have been captured directly from a multispectral camera, that is, one that captures images in four or more spectral bands that lie in or even outside the normal human vision system range of spectral wavelengths. For example, an RGBC multiprimary display may reconstruct images captured on an RGBC camera. In such cases, it may advantageous to calculate the luminance "L" value for use by the sub-pixel rendering and metameric filters, as this value may not be supplied directly by the input image. In the case of a display, the formula for calculating the luminosity can be derived from the specifications of the display, from measurements, or from the M2X matrix for that display. In the case of a multi-spectral camera, the formula could be derived from the specification or from measurements from pictures taken of test patterns of known spectral ramps. If the camera has substantially the same multiple primaries as a multi-primary display in the same system, then it would be advantageous to make the simplifying assumption that the primaries and relative luminosities of the display and camera are identical. This will simplify the math, the resulting software or hardware designs and thus decrease the total complexity and cost of the total system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A display system comprising:
    a display, said display comprising at least a first set of sub-pixels and a second set of sub-pixels further comprising at least one metamer;
    an input image data unit;
    a spatial frequency detection unit, said spatial frequency detection unit extracting a spatial frequency characteristic from said input image data; and
    an adjustment unit, said adjustment unit adjusting image data of said first set and said second set of sub-pixels according to said spatial frequency characteristic.

2. The display system of claim 1, wherein said display further comprises a display further comprising at least a first set of sub-pixels and a second set of sub-pixels, said first set of sub-pixels and said second set of sub-pixels capable of producing a metamer rendered upon said display.

3. The display system of claim 1, wherein said spatial frequency detection unit further comprises one of a group, said group comprising:
    a filter, an adaptive filter, an edge detector, a flat field detector, a blurring filter and a transform detector.

4. The display system of claim 1, wherein said characteristic comprises high spatial frequency luminance values.

5. The display system of claim 1, wherein said adjustment unit further comprises a metamer slope adjustment.

6. A display system comprising:
    a display, said display further comprising a sub-pixel repeating group, said group comprising at least one metamer further comprising of at least a first set of colored sub-pixels and a second set of colored sub-pixels;
    an optional luminance calculation unit for calculating luminance values from input image data;
    a plurality of metamer filters for producing an adjustment value based upon a relationship of said luminance values;
    a metamer adjustment unit for adjusting the intensity of said first and second sets of sub-pixels according to said adjustment value.

7. The display system of claim 6, wherein said display system further comprises:
    a sub-pixel rendering unit to sub-pixel render image data after said image data is metamer adjusted.

8. The display system of claim 6, wherein said display system further comprises:
    a sub-pixel rendering unit to sub-pixel render image data concurrently as said image data is metamer adjusted.

9. The display system of claim 7 or 8, wherein said sub-pixel rendering unit performs area resampling of said image data.

10. The display system of claim 8 or 9, wherein said display system further comprises a difference of Gaussian filter unit.

* * * * *